(12) United States Patent
Hatanaka

(10) Patent No.: US 9,507,068 B2
(45) Date of Patent: Nov. 29, 2016

(54) METHOD FOR PRODUCING ELONGATE POLARIZER PLATE

(71) Applicant: SUMITOMO CHEMICAL COMPANY, LIMITED, Tokyo (JP)

(72) Inventor: Nobuyuki Hatanaka, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/616,991

(22) Filed: Feb. 9, 2015

(65) Prior Publication Data
US 2015/0226895 A1 Aug. 13, 2015

(30) Foreign Application Priority Data
Feb. 7, 2014 (JP) ................................. 2014-021975

(51) Int. Cl.
G02B 5/30 (2006.01)
B05D 3/00 (2006.01)
B05D 5/06 (2006.01)

(52) U.S. Cl.
CPC .................................. *G02B 5/305* (2013.01)

(58) Field of Classification Search
CPC .. G02B 5/305; G02B 5/3033; G02B 5/3041; G02B 5/3083; B05D 5/06; B05D 3/007
USPC ....................... 359/487.02, 489.07
See application file for complete search history.

(56) References Cited

U.S. PATENT DOCUMENTS

| 7,763,330 B2 | 7/2010 | Lub et al. |
| 8,383,212 B2 | 2/2013 | Obata et al. |
| 2006/0078693 A1* | 4/2006 | Ishibashi ............. G02B 5/3083 428/1.31 |
| 2008/0291389 A1* | 11/2008 | Kawamoto ........... G02B 5/3016 349/194 |
| 2009/0214871 A1* | 8/2009 | Fukuda ..................... C09D 4/00 428/413 |
| 2009/0296027 A1* | 12/2009 | Kawamoto ............. B32B 23/08 349/96 |
| 2010/0068419 A1* | 3/2010 | Kim ..................... G02B 5/3016 428/1.23 |
| 2010/0208177 A1* | 8/2010 | Kobayashi ........... G02B 5/3083 349/102 |

(Continued)

FOREIGN PATENT DOCUMENTS

| JP | 06-034976 A | 2/1994 |
| JP | 09-165318 A | 6/1997 |

(Continued)

OTHER PUBLICATIONS

Japanese Industrial Standard JIS Z 8701 : 1999, First English edition published 2000, "Colour specification—The CIE 1931 standard colorimetric system and the CIE 1964 supplementary standard colorimetric system".

*Primary Examiner* — Frank Font
(74) *Attorney, Agent, or Firm* — Sughrue Mion, PLLC

(57) ABSTRACT

The present invention provides a method for producing an elongate polarizer plate having an absorption axis in a direction of 45°±15° relative to the longitudinal direction of the elongate polarizer plate. Provided is a method for producing a polarizer plate including a step of forming, on an elongate substrate, an elongate polarization film having an absorption axis in a direction of 45°±15° to the longitudinal direction of the elongate substrate. The above-mentioned production method further includes a step of forming, on an elongate substrate, an elongate orientation film having an orientation regulating force direction of 45°±15° to the longitudinal direction of the elongate substrate, and can perform the elongate orientation film formation step and the elongate polarizer plate formation step in this order.

20 Claims, 1 Drawing Sheet

(56) References Cited

U.S. PATENT DOCUMENTS

| | | | |
|---|---|---|---|
| 2010/0245722 A1* | 9/2010 | Yoneyama | G02B 5/02 349/84 |
| 2013/0083277 A1* | 4/2013 | Yamamoto | G02B 5/3016 349/123 |
| 2014/0044870 A1 | 2/2014 | Asanoi et al. | |
| 2015/0043072 A1* | 2/2015 | Sase | G02B 5/3083 359/489.07 |

FOREIGN PATENT DOCUMENTS

| | | |
|---|---|---|
| JP | 2007-510946 A | 4/2007 |
| JP | 4719156 B2 | 4/2011 |
| JP | 2011-242743 A | 12/2011 |
| JP | 2012-226231 A | 11/2012 |
| JP | 2013-101328 A | 5/2013 |
| WO | 2012/144587 A1 | 10/2012 |

* cited by examiner

METHOD FOR PRODUCING ELONGATE POLARIZER PLATE

BACKGROUND OF THE INVENTION

Field of the Invention

The present invention relates to a method for producing an elongate polarizer plate.

Description of the Related Art

An optical plate such as a polarizer plate is used for the purpose of optical compensation for a flat panel display device such as a liquid crystal display device or an organic EL display device. In recent years, a flat panel display device has been eagerly required to be thin, and along with this requirement, a polarizer plate has also been required to be thinner than before. For example, JP-T 2007-510946 discloses a thin polarizer plate produced from a composition containing a polymerizable liquid crystal compound and a dichromic dye. Further, a polarizer plate having an absorption axis in a oblique direction to the longitudinal direction of the polarizer plate has been required.

An industrial production of an elongate polarizer plate having an absorption axis in a oblique direction to the longitudinal direction of the polarizer plate requires a complicated processing technique, and an innovative production method has been desired.

SUMMARY OF THE INVENTION

The present invention includes the following aspects.

[1] A method for producing an elongate polarizer plate, comprising a step of forming, on an elongate substrate, an elongate polarization film having an absorption axis in a direction of 45°±15° relative to the longitudinal direction of the elongate substrate.

[2] The method for producing an elongate polarizer plate according to [1], further comprising a step of forming, on the elongate substrate, an elongate orientation film having a direction of an orientation regulating force of 45°±15° relative to the longitudinal direction of the elongate substrate, on the elongate substrate, wherein the step of forming the elongate orientation film and the step of forming the elongate polarizer plate are performed in this order.

[3] The method for producing an elongate polarizer plate according to [2], wherein the elongate orientation film is formed from a first dried layer.

[4] The method for producing an elongate polarizer plate according to [3], wherein the first dried layer is formed by drying a first applied layer formed by continuously applying a composition for forming an orientation film onto the elongate substrate, and the elongate orientation film is formed by irradiating the first dried layer with light polarized in a direction of 45°±15° relative to the longitudinal direction of the elongate substrate.

[5] The method for producing an elongate polarizer plate according to any one of [1] to [4], wherein the elongate polarization film is formed from a second dried layer.

[6] The method for producing an elongate polarizer plate according to [5], wherein the second dried layer is formed by drying a second applied layer formed by continuously applying a composition for forming a polarization film containing a dichromic dye onto an elongate photo-orientation film, and the second dried layer is cured to form the elongate polarization film having an absorption axis in a direction of 45°±15° relative to the longitudinal direction of the elongate substrate.

[7] The method for producing an elongate polarizer plate according to [1] to [6], wherein the elongate substrate is an elongate retardation plate having a function of a quarter wave plate.

[8] An elongate polarizer plate comprising an elongate substrate and an elongate polarization film, wherein the direction of the absorption axis of the elongate polarization film is of 45°±15° relative to the longitudinal direction of the elongate substrate.

[9] The elongate polarizer plate according to [8], wherein the elongate polarization film has a thickness of 5 μm or less.

[10] The elongate polarizer plate according to [8] or [9], further having an elongate orientation film between the elongate substrate and the elongate polarization film.

[11] The elongate polarizer plate according to [10], wherein the elongate orientation film is an elongate photo-orientation film.

[12] The elongate polarizer plate according to any one of [8] to [11], wherein the elongate polarization film contains a dichromic dye.

[13] The elongate polarizer plate according to any one of [8] to [12], wherein the elongate polarization film contains a polymer of a polymerizable liquid crystal compound.

[14] The elongate polarizer plate according to any one of [8] to [13], wherein the elongate polarization film exhibits a Bragg peak in x-ray diffractometry.

[15] The elongate polarizer plate according to any one of [8] to [14], wherein the elongate substrate is an elongate retardation plate having a function of a quarter wave plate, and the elongate retardation plate has a slow axis in a direction of 0°±15° or 90°±15° relative to a longitudinal direction of the elongate retardation plate.

[16] The elongate polarizer plate according to [15], wherein the elongate retardation plate has optical characteristics represented by the following formulas (40), (50) and (51):

$$100 < Re(550) < 160 \tag{40}$$

$$Re(450)/Re(550) \leq 1.00 \tag{50}$$

$$1.00 \leq Re(650)/Re(550) \tag{51}$$

wherein $Re(450)$, $Re(550)$, and $Re(650)$ represent retardations to light with wavelengths of 450 nm, 550 nm, and 650 nm, respectively.

[17] The elongate polarizer plate according to [15] or [16], wherein the elongate polarizer plate has an ellipticity for the entire range visible light of 50% or more and an ellipticity to light with a wavelength of 550 nm of 70% or more.

[18] The elongate polarizer plate according to any one of [8] to [17], having a luminous degree of polarization of 80% or more.

[19] The elongate polarizer plate according to any one of [8] to [18], having a luminous transmittance of 35% or more.

[20] A polarizer plate obtained by cutting out the elongate polarizer plate according to any one of [8] to [19] into a rectangular form with the longer sides thereof forming an angle of 0° or 90° relative to the direction of the elongate substrate.

[21] A display device comprising the polarizer plate according to [20].

[22] A display device with a polarizer plate, the display device being obtained by sticking the elongate polarizer plate according to any one of [8] to [19] to a display device.

According to the present invention, an elongate polarizer plate having an absorption axis in a direction of 45°±15° relative to the longitudinal direction of an elongate polarizer plate can be produced.

DETAILED DESCRIPTION OF THE PREFERRED EMBODIMENTS

Elongate Substrate

Figure 1:
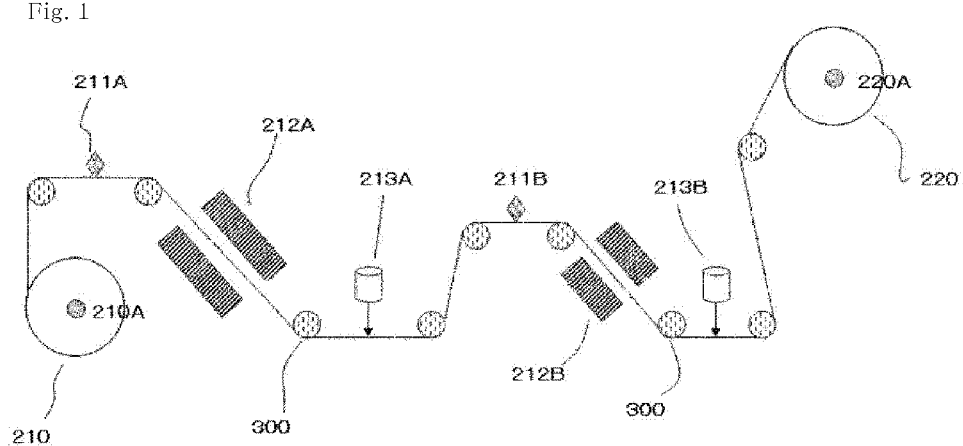
FIG. 1 is a schematic diagram showing a main part of a method (roll-to-roll manner) for continuously producing an elongate polarizer plate.

An elongate substrate is usually a resin substrate.

The resin substrate is usually a transparent resin substrate. The transparent resin substrate means a substrate having translucency for transmitting light, particularly visible light, and the term "translucency" means a characteristic of transmittance of 80% or more for light rays with a wavelength of 380 nm to 780 nm.

The elongate substrate is preferably an elongate retardation plate having a function of a quarter wave plate. The elongate substrate more preferably has an optical property represented by the formula (40), and further preferably has an optical property represented by the formula (40-1):

$$100 < Re(550) < 160 \qquad (40)$$

$$130 < Re(550) < 150 \qquad (40\text{-}1)$$

wherein Re(550) represents an in-plane retardation value for light with a wavelength of 550 nm.

The elongate substrate further preferably has optical characteristics represented by the formulas (50) and (51):

$$Re(450)/Re(550) \leq 1.00 \qquad (50)$$

$$1.00 \leq Re(650)/Re(550) \qquad (51).$$

$Re(\lambda)$ represents an in-plane retardation value for light with a wavelength of $\lambda$ nm.

The above-mentioned elongate retardation plate can be obtained by stretching an elongate substrate having no retardation. An optical property of the elongate retardation plate can be adjusted by a stretching method, and the elongate substrate having the optical characteristics represented by the formulas (50) and (51) can be obtained by stretching an elongate substrate formed from a resin having a specified chemical structure.

A slow axis direction of the elongate retardation plate differs depending on a stretching method, and a slow axis and an optical axis can be determined depending on a stretching method such as uniaxial, biaxial, or oblique stretching. An elongate retardation plate obtained by uniaxial stretching in the longitudinal direction is produced with high productivity and is versatile, and therefore it is preferable.

The elongate substrate preferably has a function of a quarter wave plate and a slow axis in a direction of 0°±10° or 90°±10° relative to the longitudinal direction of the elongate retardation plate. If such an elongate substrate is used, it is easy to obtain an elongate polarizer plate having a function as a circularly polarizing plate.

The in-plane retardation value of the elongate substrate can be adjusted based on its thickness. Since the in-plane retardation value can be determined according to the formula (10), $\Delta n(\lambda)$ and the thickness d may be adjusted in order to obtain a desired in-plane retardation value ($Re(\lambda)$). That is, adjustment of $\Delta n(\lambda)$ and the thickness d makes it possible to obtain an elongate substrate having a function of a quarter wave plate.

$$Re(\lambda) = d \times \Delta n(\lambda) \qquad (10)$$

In the formula, $Re(\lambda)$ represents an in-plane retardation value at a wavelength of $\lambda$ nm; d represents the thickness; and $\Delta n(\lambda)$ represents a birefringence at a wavelength of $\lambda$ nm. The birefringence $\Delta n(\lambda)$ can be obtained by measuring an in-plane retardation value and dividing the in-plane retardation value by the thickness of the retardation layer.

Examples of the resins constituting the elongate substrate include polyolefins such as polyethylene, polypropylene, and norbornene-based polymers; cycloolefin-based resins; polyvinyl alcohol; polyethylene terephthalate; polymethacrylic acid esters; polyacrylic acid esters; cellulose esters such as triacetyl cellulose, diacetyl cellulose, and cellulose acetate propionate; polyethylene naphthalate; polycarbonate; polysulfone; polyether sulfone; polyether ketone; polyphenylenesulfide; and polyphenylene oxide. The resins are preferably cellulose esters, cycloolefin-based resins, polycarbonate, polyethersulfone, polyethyleneterephthalate, or polymethacrylic acid esters.

The cellulose ester is cellulose in which at least apart of hydroxyl groups contained in the cellulose is esterified and which is commercially available. A substrate containing a cellulose ester is also commercially available. Examples of the substrate containing a cellulose ester, which is commercially available, include Fujitac (registered trademark) film (FUJIFILM Corporation), KC8UX2M (Konica Minolta Opto Products Co., Ltd.), KC8UY (Konica Minolta Opto Products Co., Ltd.), and KC4UY (Konica Minolta Opto Products Co., Ltd.).

The cycloolefin-based resin includes polymers of a cycloolefin such as norbornene or polycyclic norbornene-based monomer, and their copolymers. The cycloolefin-based resin may include a ring-opened structure or may be those obtained by hydrogenation of a cycloolefin-based resin including a ring-opened structure. Further, the cycloolefin-based resin may include a structural unit derived from a chain olefin and a vinylated aromatic compound to an extent that the transparency is not considerably deteriorated and that the hygroscopicity is not considerably increased. The cycloolefin-based resin may have a polar group introduced in its molecules.

Examples of the chain olefin include ethylene and propylene, and examples of the vinylated aromatic compound include styrene, α-methylstyrene, and alkyl-substituted styrene.

When the cycloolefin-based resin is a copolymer of a cycloolefin with a chain olefin or a vinylated aromatic compound, the content of the structural unit derived from the cycloolefin is usually 50 mol % or less and preferably 15 to 50 mol % in the entire structural units of the copolymer.

When the cycloolefin-based resin is a terpolymer of a cycloolefin, a chain olefin, and a vinylated aromatic compound, the content of the structural unit derived from the chain olefin is usually 5 to 80 mol % in the entire structural units of the copolymer; and the content of the structural unit derived from the vinylated aromatic compound is usually 5 to 80 mol % in the entire structural units of the copolymer. The terpolymer has an advantage that the use amount of a costly cycloolefin can be relatively reduced.

The cycloolefin-based resin is commercially available. Examples of the commercially available cycloolefin-based resin include Topas (registered trademark) (manufactured by Ticona), ARTON (registered trademark) (manufactured by JSR Corporation), ZEONOR (registered trademark) and ZEONEX (registered trademark) (both manufactured by Zeon Corporation), as well as APEL (registered trademark) (manufactured by Mitsui Chemicals, Inc.). Such a cycloolefin-based resin can be formed into a film by a conventional procedure, for example, a solvent casting method or a melt extrusion method to obtain an elongate substrate. Examples of an elongate substrate containing the commercially available cycloolefin-based resin include S-SINA (registered trademark) and SCA40 (both manufactured by Sekisui Chemical Co., Ltd), ZEONOR film (registered trademark) (manufactured by Optes Co., Ltd.), and ARTON film (registered trademark) (manufactured by JSR Corporation).

The elongate substrate may be performed a surface treatment. Examples of the surface treatment for the elongate substrate include a corona or plasma treatment under vacuum to atmospheric pressure, a laser treatment, an ozone treatment, a saponification treatment, a flame treatment, a coupling agent application treatment, a primer treatment, and a treatment by graft polymerization method for depositing a reactive monomer or a polymer having reactivity on the elongate substrate surface and thereafter causing a reaction by irradiation with radiation, plasma or ultraviolet radiation. Among them, a corona or plasma treatment under vacuum to atmospheric pressure is preferable.

Examples of the surface treatment for an elongate substrate by corona or plasma include a method in which an elongate substrate is arranged between mutually opposite electrodes, corona or plasma is generated under near-atmospheric pressure, and thereby the elongate substrate is surface-treated; a method in which gas is led between opposite electrodes, plasma of the gas is generated between the electrodes, and spraying the gas in a plasma state to the elongate substrate; and a method in which glow electric discharge plasma is generated in a low pressure condition and thereby the elongate substrate is surface-treated.

Among them, preferable is a method in which an elongate substrate is arranged between mutually opposite electrodes, corona or plasma is generated under near-atmospheric pressure, and thereby the elongate substrate is surface-treated, or a method in which gas is led between opposite electrodes, plasma of the gas is generated between the electrodes, and spraying the gas in a plasma state to the elongate substrate. Such a surface treatment by corona or plasma may be performed usually by a commercially available surface treatment device.

The elongate substrate may have a protection film on a surface reverse to the surface on which a composition for forming a polarization film is applied. Examples of the protection film include polyethylene, polyethylene terephthalate, polycarbonate, and polyolefin plates, as well as plates having a pressure-sensitive adhesive layer on these plates. Among them, polyethylene terephthalate is preferable since having slight thermal deformation at the time of drying. When the elongate substrate has a protection film on a surface reverse to the surface on which the composition for forming a polarization film is applied, a shaking of the film and a slight vibration of the applied surface in conveying the substrate can be suppressed, and uniformity of a coating can be improved.

The thickness of the elongate substrate is preferable as it is thinner in terms of the weight adequate for practical handling, but if it is too thin, the strength tends to be low and the processability tends to be inferior. The thickness of the elongate substrate is usually 5 to 300 μm, and preferably 20 to 200 μm.

The length of the elongate substrate in the longitudinal direction is usually 10 to 3000 m, and preferably 100 to 2000 m. The length of the elongate substrate in the short direction is usually 0.1 to 5 m, and preferably 0.2 to 2 m. In this specification, the "elongate" substrate may include "an elongate substrate wound in a rolled state" and "an elongate substrate unwound off from a rolled elongate substrate", and the "elongate" in an elongate orientation film and an elongate polarizer plate also means the same.

<Elongate Orientation Film>

The elongate polarizer plate of the present invention has an elongate substrate and an elongate polarization film, and the direction of the absorption axis of the elongate orientation film is preferably at an angle of 45°±15° to the longitudinal direction of the elongate substrate. The elongate polarizer plate can be obtained by a method of, for example, forming an elongate orientation film on an elongate substrate and forming an elongate polarization film thereon. The elongate orientation film has an orientation regulating force for aligning a dichromic dye and a polymerizable liquid crystal compound in a desired direction. That is, because the elongate orientation film can orient a dichromic dye contained in a composition for forming a polarization film toward the direction of the orientation regulating force of the elongate orientation film, the direction of the absorption axis of the elongate orientation film can be the above angle by curing the composition for forming the polarization film. The absorption axis of the elongate orientation film preferably corresponds to the direction of the orientation regulating force of the elongate orientation film.

The elongate orientation film preferably has solvent resistance high enough not to be dissolved by application of the composition for forming the polarization film, and also to has heat resistance high enough to stand a heat treatment for removing the solvent or aligning a dichromic dye. Examples of the elongate orientation film include an elongate photo-orientation film, an elongate orientation film containing an orientational polymer, and an elongate grooved orientation film having uneven patterns or a plurality of grooves in the surface. Preferable is an elongate photo-orientation film.

The thickness of the elongate orientation film is usually 10 nm to 10000 nm, preferably 10 nm to 1000 nm, and more preferably 500 nm or less and more preferably 10 nm or thicker. If it is within the above-mentioned range, the orientation regulating force is sufficiently exhibited.

The direction of the orientation regulating force of the elongate orientation film is of 45°±15°, preferably 45°±10°, more preferably 45°±5°, and particularly preferably 45°±1° relative to the longitudinal direction of the elongate substrate.

<Elongate Photo-Orientation Film>

An elongate photo-orientation film is usually formed from a composition for forming a photo-orientation film.

The composition for forming the photo-orientation film contains a polymer or monomer having a photo-reactive group, and a solvent.

The photo-reactive group means a group having an orientation function by light irradiation. Specifically, the photoreactive group can cause photo-reaction to derive the orientation function such as orientation induction or isomerization of molecules, dimerization, photo-crosslinking reaction, or photo-decomposition reaction when being irradiated with light. Among the photo-reactive groups, those which can cause dimerization or photo-crosslinking reaction are preferable since being excellent in orientation property. Examples of the photo-reactive groups, which can cause the above-mentioned reaction, preferably include groups having unsaturated bonds, particularly groups having double bonds, and particularly preferably groups having at least one bond selected from the group consisting of a carbon-carbon double bond (C═C bond), a carbon-nitrogen double bond (C═N bond), a nitrogen-nitrogen double bond (N═N bond), and a carbon-oxygen double bond (C═O bond).

Examples of the photo-reactive group having a C═C bond include a vinyl group, a polyene group, a stilbene group, a stilbazole group, a stilbazolium group, a chalcone group, and a cinnamoyl group. Examples of the photo-reactive group having a C═N bond may include groups having structures such as aromatic Schiff base and aromatic hydrazone. Examples of the photo-reactive group having an N═N bond include an azobenzene group, an azonaphthalene group, an aromatic heterocyclic azo group, a bisazo group, and a formazan group, and a group having azoxybenzene as a basic structure. Examples of the photo-reactive group having a C═O bond include a benzophenone group, a coumarin group, an anthraquinone group, and a maleimide group. These groups may have substituent groups such as an alkyl group, an alkoxy group, an aryl group, an allyloxy group, a cyano group, an alkoxycarbonyl group, a hydroxyl group, a sulfonic acid group, and a haloalkyl group.

Among them, a photo-reactive group having photo-dimerization reactivity is preferable, and in terms of relatively low dose of polarized light irradiation needed for photo-orientation and easy obtainment of a photo-orientation film excellent in heat stability and stability with the lapse of time, a cinnamoyl group and a chalcone group are preferable. The polymer having a photo-reactive group is particularly preferably a polymer having a cinnamoyl group so as to form a cinnamic acid structure at the terminal parts of its side chains.

The solvent for the composition for forming the photo-orientation film is preferably a solvent which dissolves a polymer and a monomer having a photo-reactive group. Examples of the solvent include water, alcohols such as methanol, ethanol, ethylene glycol, isopropyl alcohol, propylene glycol, methyl cellosolve, butyl cellosolve, and propylene glycol monomethyl ether; ester-based solvents such as ethyl acetate, butyl acetate, ethylene glycol methyl ether acetate, gamma-butyrolactone, propylene glycol methyl ether acetate, and ethyl lactate; ketone-based solvents such as acetone, methyl ethyl ketone, cyclopentanone, cyclohexanone, methyl amyl ketone, and methyl isobutyl ketone; non-chlorine-based aliphatic hydrocarbon solvents such as pentane, hexane, and heptane; non-chlorine-based aromatic hydrocarbon solvents such as toluene and xylene; nitrile-based solvents such as acetonitrile; ether-based solvents such as tetrahydrofuran and dimethoxyethane; and chlorine-based solvents such as chloroform and chlorobenzene. These solvents may be used alone or in combination.

The content of the polymer or monomer having a photo-reactive group in the composition for forming the photo-orientation film may be adjusted properly depending on the kind of the polymer or monomer having a photo-reactive group and the thickness of a photo-orientation film to be produced. The content is preferably at least 0.2 mass % or more, and more preferably in a range of 0.3 to 10 mass %. The composition may contain a polymer material such as polyvinyl alcohol or polyimide and a photosensitizer to an extent that the properties of the photo-orientation film are not significantly deteriorated.

<First Applied Layer>

When the orientation film is a photo-orientation film, a first applied layer is formed by applying the above-mentioned composition for forming a photo-orientation film onto an elongate substrate. The first applied layer may also be formed by applying the composition forming other orientation films as described above to an elongate substrate.

Examples of the method for continuously applying the composition for forming the photo-orientation film to the elongate substrate include a gravure coating method, a die coating method, an applicator method, and a flexo-method. Preferable are a gravure coating method, a die coating method, and a flexo-method.

<First Dried Layer>

A first dried layer is formed by drying the first applied layer. In the present specification, the first dried layer means those in which the content of the solvent contained in the first applied layer is lowered to 50 mass % or less in the entire mass of the first applied layer.

Examples of the method for drying the first applied layer include a natural drying method, a forced-air drying method, a heat drying method, and a vacuum drying method. Preferable is a method in combination of a forced-air drying method and a heat drying method. The drying temperature is preferably 10 to 250° C., and more preferably 25 to 200° C. The drying time is preferably 10 seconds to 60 minute, and more preferably 30 seconds to 30 minutes. The solvent contained in the first applied layer is removed by the drying.

The content of the solvent in the first dried layer is preferably 30 mass % or less, more preferably 10 mass % or less, further preferably 5 mass % or less, and particularly preferably 1 mass % or less.

An elongate photo-orientation film having the direction of orientation regulating force oblique to the longitudinal direction of the elongate substrate can be obtained by irradiating the first dried layer with polarized light obliquely in the film plane to the longitudinal direction of the elongate substrate. The direction of orientation regulating force can be determined by the irradiation angle of the polarized light in the film plane.

The first dried layer may be irradiated with the polarized light directly or through the elongate substrate.

The polarized light preferably has a wavelength in a range in which the photo-reactive group of the polymer or monomer having the photo-reactive group can absorb light energy. Practically, ultraviolet rays with a wavelength in a range of 250 to 400 nm are preferable.

Examples of a light source for the polarized light include a xenon lamp, a high pressure mercury lamp, an extra high pressure mercury lamp, a metal halide lamp, and ultraviolet laser of KrF or ArF. Preferable are a high pressure mercury lamp, an extra high pressure mercury lamp, and a metal halide lamp. These lamps are preferable since the emission intensity of ultraviolet rays with a wavelength of 313 nm is high.

The polarized light can be obtained by allowing light from, for example, the above-mentioned light source to pass through a polarizer. The polarization angle of the polarizer is adjusted to thereby arbitrarily adjust the polarized light direction. Examples of the polarizer include a polarization filter, Glan-Thompson or Glan-Taylor polarization prism, and a wire grid type polarizer. The polarized light is preferably substantially parallel light rays.

The direction of orientation regulating force can be adjusted arbitrarily by adjusting the angle of the polarized light irradiated. The direction of the polarized light is 45°±15°, preferably 45°±10°, more preferably 45°±5°, and particularly preferably 45°±1° relative to the longitudinal direction of the elongate substrate.

If masking is performed at the time of irradiation with the polarized light, a plurality of regions (patterns) with different orientation regulating force directions can be formed in the orientation film. The elongate photo-orientation film preferably has uniform orientation patterns.

Consequently, an elongate orientation plate in which the elongate photo-orientation film having the direction of the orientation regulating force of 45°±15° relative to the longitudinal direction of the elongate substrate is laminated on the elongate substrate can be obtained. In the present specification, a film showing the orientation regulating force is referred to as an orientation film, and a film obtained by subjecting the first dried layer to a prescribed operation and a film in which the first dried layer itself shows the orientation regulating force correspond to the orientation film.

The elongate orientation plate can induce orientation of a liquid crystal material. If the direction of the orientation regulating force of the elongate photo-orientation film is oblique to the longitudinal direction of the elongate substrate, the elongate orientation plate is useful for producing an elongate polarizer plate having the direction of the absorption axis oblique to the longitudinal direction of the elongate substrate.

<Elongate Orientation Film Containing Orientational Polymer>

Examples of the orientational polymer include polyamides and gelatins having amide bonds, polyimides having imide bonds and polyamic acids which are hydrolyzed products of the polyimides, polyvinyl alcohol, alkyl-modified polyvinyl alcohol, polyacrylamide, polyoxazole, polyethyleneimine, polystyrene, polyvinyl pyrrolidone, polyacrylic acid, and polyacrylic acid esters. Among them, polyvinyl alcohol is preferable. Two or more kinds of orientational polymers may be used in combination.

The elongate orientation film containing an orientational polymer is usually formed from an orientational polymer composition in which an orientational polymer is dissolved in a solvent. Examples of the solvent include those which are the same as those exemplified as the solvent of the composition for forming the photo-orientation film.

The concentration of the orientational polymer in the orientational polymer composition may be within a range in which the orientational polymer is completely dissolved in the solvent. The content of the orientational polymer in the orientational polymer composition is preferably 0.1 to 20 mass %, and more preferably 0.1 to 10 mass %.

The orientational polymer composition is commercially available. Examples of the commercially available orientational polymer composition include SUNEVER (registered trademark, manufactured by Nissan Chemical Industries, Ltd.) and OPTOMER (registered trademark, manufactured by JSR Corporation).

A first applied layer and a first dried layer can be formed from the orientational polymer composition by a same method described at the composition for forming the photo-orientation film.

A first dried layer formed from the orientational polymer composition may be used as it is as an elongate orientation film if it shows orientation property, or may be subjected to a rubbing treatment.

An example of a method for the rubbing treatment includes a method for bringing the first dried layer into contact with a rotating rubbing roll on which a rubbing cloth is wound. If masking is performed at the time of executing the rubbing treatment, a plurality of regions (patterns) with different orientation directions can also be formed in the first dried layer.

The angle of the rubbing treatment is adjusted to thereby arbitrarily adjust the direction of the orientation regulating force. The direction of the rubbing treatment is 45°±15°, preferably 45°±10°, more preferably 45°±5°, and particularly preferably 45°±1° relative to the longitudinal direction of the elongate substrate.

<Grooved Orientation Film>

A grooved orientation film is a film having uneven patterns or a plurality of grooves in the film surface. When liquid crystal molecules are put on a film having a plurality of grooves in a linear manner arranged at even intervals, the liquid crystal molecules are aligned in the direction along the grooves. The direction of orientation regulating force can be determined by forms of the groove. A first applied layer and a first dried layer can be formed from a composition for forming a grooved orientation film by a same method described at the composition for forming the photo-orientation film.

Examples of a method for obtaining the grooved orientation film include a method in which a photosensitive polyimide film surface is exposed through an exposure mask having patterned slits, and then development and rinsing treatment are performed to form uneven patterns; a method in which a UV-curable resin layer before curing is formed on a plate-like master disk having grooves in the surface, the resin layer is transferred to a substrate, and the resin layer is cured; and a method in which a roll-like master disk having a plurality of grooves is pushed against a UV-curable resin layer before curing which is formed on a substrate to form an uneven form, and then the resin layer is cured. Specifically, examples thereof include the methods described in JP-A H06-34976 and JP-A 2011-242743.

Among the above-mentioned methods, preferable is a method in which a roll-like master disk having a plurality of grooves is pushed against a UV-curable resin layer before curing which is formed on a substrate to form an uneven form, and then the resin layer is cured. The roll-like master disk is preferably stainless steel (SUS) from the viewpoint of durability.

Examples of the UV-curable resin include mono-functional acrylate polymers, polyfunctional acrylate polymers, and polymers of their mixtures.

The mono-functional acrylate means a compound having one group selected from the group consisting of an acryloyloxy group ($CH_2$=CH—COO—) and a methacryloyloxy group ($CH_2$=C($CH_3$)—COO—) (hereinafter, may be referred to as (meth)acryloyloxy group). (Meth)acrylate means acrylate or methacrylate.

Example of the mono-functional acrylate having one (meth)acryloyloxy group include $C_{4-16}$ alkyl (meth)acrylate, $C_{2-14}$β-carboxyalkyl (meth)acrylate, $C_{2-14}$ alkylated phenyl (meth)acrylate, methoxypolyethylene glycol (meth)acrylate, phenoxy polyethylene glycol (meth)acrylate, and isobornyl (meth)acrylate.

The poly-functional acrylate means a compound having 2 or more (meth)acryloyloxy groups, and is preferably a compound having 2 to 6 (meth)acryloyloxy groups.

Examples of a poly-functional acrylate having 2 (meth)acryloyloxy groups include 1,3-butanediol di(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bisphenol A bis(acryloyloxyethyl) ether; ethoxylated bisphenol A di(meth)acrylate; propoxylated neopentyl glycol di(meth)acrylate; ethoxylated neopentyl glycol di(meth)acrylate, and 3-methylpentanediol di(meth)acrylate.

Examples of a poly-functional acrylate having 3 to 6 (meth)acryloyloxy groups include:

trimethylolpropane tri(meth)acrylate; pentaerythritol tri (meth)acrylate; tris(2-hydroxyethyl) isocyanurate tri(meth) acrylate; ethoxylated trimethylolpropane tri(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol penta (meth)acrylate; tripentaerythritol hexa(meth)acrylate; tripentaerythritol hepta(meth)acrylate; tripentaerythritol octa(meth)acrylate;

a reaction product of pentaerythritol tri(meth)acrylate and an acid anhydride; a reaction product of dipentaerythritol penta(meth)acrylate and an acid anhydride; a reaction product of tripentaerythritol hepta(meth)acrylate and an acid anhydride;

caprolactone-modified trimethylolpropane tri(meth)acrylate; caprolactone-modified pentaerythritol tri(meth)acrylate; caprolactone-modified tris(2-hydroxyethyl) isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reaction product of caprolactone-modified pentaerythritol tri(meth) acrylate and an acid anhydride; a reaction product of caprolactone-modified dipentaerythritol penta(meth)acrylate and an acid anhydride; and a reaction product of caprolactone-modified tripentaerythritol hepta(meth)acrylate and an acid anhydride.

Caprolactone-modified means introduction of a ring opened body or ring opened polymer of caprolactone between an alcohol-derived portion of the (meth)acrylate compound and the (meth)acryloyloxy group.

The poly-functional acrylate is commercially available. Examples of the commercially available products include A-DOD-N, A-HD-N, A-NOD-N, APG-100, APG-200, APG-400, A-GLY-9E, A-GLY-20E, A-TMM-3, A-TMPT, AD-TMP, ATM-35E, A-TMMT, A-9550, A-DPH, HD-N, NOD-N, NPG, and TMPT [manufactured by Shin-Nakamura Chemical Co., Ltd.]; "ARONIX M-220", "ARONIX M-325", "ARONIX M-240", "ARONIX M-270", "ARONIX M-309", "ARONIX M-310", "ARONIX M-321", "ARONIX M-350", "ARONIX M-360", "ARONIX M-305", "ARONIX M-306", "ARONIX M-450", "ARONIX M-451", "ARONIX M-408", "ARONIX M-400", "ARONIX M-402", "ARONIX M-403", "ARONIX M-404", "ARONIX M-405", and "ARONIX M-406" [manufactured by Toagosei Co., Ltd.]; and "EBECRYL 11", "EBECRYL 145", "EBECRYL 150", "EBECRYL 40", "EBECRYL 140", "EBECRYL 180", DPGDA, HDDA, TPGDA, HPNDA, PETIA, PETRA, TMPTA, TMPEOTA, DPHA, and EBECRYL Series [manufactured by Daicel Cytech].

In order to obtain orientation with slight orientation disorder, the width of a projected part of the grooved orientation film is preferably 0.05 μm to 5 μm, the width of a recessed part is preferably 0.1 μm to 5 μm, and the depth of an unevenness is preferably 2 μm or shallower and more preferably 0.01 μm to 1 μm or shallower.

<Composition for Forming a Polarization Film>

The composition for forming the polarization film of the present invention contains a dichromic dye.

The viscosity of the composition for forming the polarization film is preferably 10 mPa·s or less, and more preferably 0.1 to 7 mPa·s since the thickness of a second applied layer hardly becomes uneven.

<Dichromic Dye>

A dichromic dye means a dye having a characteristic such that the absorbance in the long axis direction of molecule is different from that in the short axis direction of molecule.

The dichromic dye is preferably those having an absorption maximum wavelength (λMAX) in a range of 300 to 700 nm. Examples of the dichromic dyes include acridine dyes, oxazine dyes, cyanine dyes, naphthalene dyes, azo dyes, and anthraquinone dyes, and among them, azo dyes are preferable. Examples of the azo dyes include monoazo dyes, bisazo dyes, trisazo dyes, tetrakisazo dyes, and stilbene dyes, and bisazo dyes and trisazo dyes are preferable. The dichromic dyes may be used alone or in combination, and three or more kinds thereof are preferably used in combination. Particularly, three or more kinds of azo compounds are preferable to be used in combination.

Examples of the azo dye include compounds represented by the formula (2) (hereinafter, may be referred to as "compound (2)").

$$A^1(-N=N-A^2)_p-N=N-A^3 \qquad (2)$$

[In the formula (2), $A^1$ and $A^3$ each independently represent an optionally substituted phenyl group, an optionally substituted naphthyl group, or an optionally substituted monovalent heterocyclic group; $A^2$ represents an optionally substituted 1,4-phenylene group, an optionally substituted naphthalene-1,4-diyl group, or an optionally substituted divalent heterocyclic group; p represents an integer of 1 to 4; and in the case where p is an integer of 2 or more, a plurality of $A^2$ may be each independently the same or different.]

Examples of the monovalent heterocyclic group include groups obtained by removing one hydrogen atom from heterocyclic compounds such as quinoline, thiazole, benzothiazole, thienothiazole, imidazole, benzoimidazole, oxazole, and benzoxazole. Examples of the divalent heterocyclic group include groups obtained by removing 2 hydrogen atoms from the above-mentioned heterocyclic compounds.

Examples of substituent groups which are optionally included in the phenyl group, naphthyl group, and monovalent heterocyclic group in $A^1$ and $A^3$, and the p-phenylene group, naphthalene-1,4-diyl group, and divalent heterocyclic group in $A^2$ include a $C_{1-4}$ alkyl group; $C_{1-4}$ alkoxy groups such as a methoxy group, an ethoxy group, and a butoxy group; $C_{1-4}$ fluoroalkyl groups such as a trifluoromethyl group; a nitro group; a halogen atom; substituted or unsubstituted amino groups such as an amino group, a diethylamino group, and a pyrrolidino group (substituted amino group means an amino group having one or two $C_{1-6}$ alkyl groups, or an amino group in which two substituted alkyl groups are bonded to each other to form a $C_{2-8}$ alkanediyl group; and unsubstituted amino group means —NH$_2$.). Specific examples of the $C_{1-6}$ alkyl group are the same as those exemplified in the substituent groups which are optionally included in the phenylene group of the compound (1).

Among the compound (2), compounds represented by the following formulas (2-1) to (2-6) are preferable.

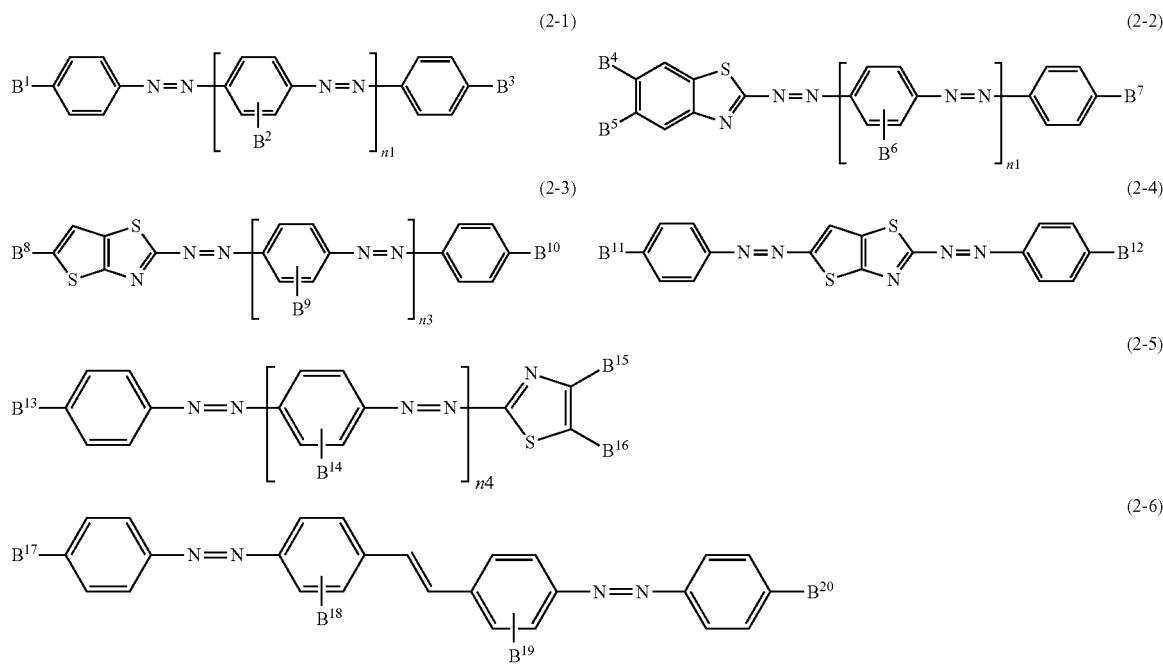

[In the formulas (2-1) to (2-6), $B^1$ to $B^{20}$ each independently represent a hydrogen atom, a $C_{1-6}$ alkyl group, a $C_{1-4}$ alkoxy group, a cyano group, a nitro group, a substituted or unsubstituted amino group (definitions of the substituted amino group and the unsubstituted amino group are as described above), a chlorine atom, or a trifluoromethyl group;

n1 to n4 each independently represent an integer of 0 to 3;

when n1 is 2 or more, a plurality of $B^2$ may be each independently the same or different;

when n2 is 2 or more, a plurality of $B^6$ may be each independently the same or different;

when n3 is 2 or more, a plurality of $B^9$ may be each independently the same or different; and when n4 is 2 or more, a plurality of $B^{14}$ may be each independently the same or different.]

The above-mentioned anthraquinone dye is preferably a compound represented by the formula (2-7):

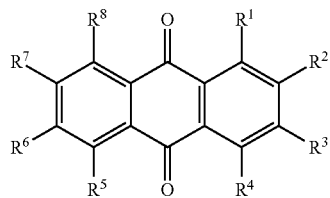

[in the formula (2-7), $R^1$ to $R^8$ each independently represent a hydrogen atom, $-R^x$, $-NH_2$, $-NHR^x$, $-NR^x_2$, $-SR^x$, or a halogen atom; and $R^x$ represents a $C_{1-4}$ alkyl group or a $C_{6-12}$ aryl group.].

The above-mentioned oxazine dye is preferably a compound represented by the formula (2-8):

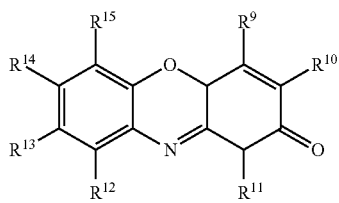

[in the formula (2-8), $R^9$ to $R^{18}$ each independently represent a hydrogen atom, $-R^x$, $-NH_2$, $-NHR^x$, $-NR^x_2$, $-SR^x$, or a halogen atom; and $R^x$ represents a $C_{1-4}$ alkyl group or a $C_{6-12}$ aryl group.].

The above-mentioned acridine dye is preferably a compound represented by the formula (2-9):

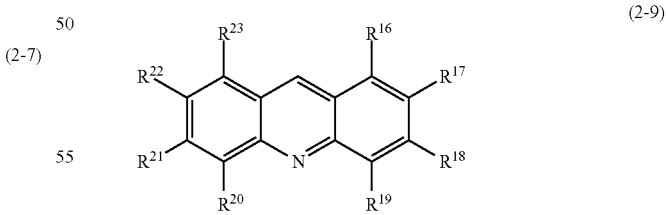

[in the formula (2-9), $R^{16}$ to $R^{23}$ each independently represent a hydrogen atom, $-R^x$, $-NH_2$, $-NHR^x$, $-NR^x_2$, $-SR^x$, or a halogen atom; and $R^x$ represents a $C_{1-4}$ alkyl group or a $C_{6-12}$ aryl group.].

Examples of the $C_{1-4}$ alkyl group represented by $R^x$ in the formulas (2-7), (2-8), and (2-9) include a methyl group, an ethyl group, a propyl group, a butyl group, a pentyl group, and a hexyl group; and examples of the $C_{6-12}$ aryl group include a phenyl group, a tolyl group, a xylyl group, and a naphthyl group.

The above-mentioned cyanine dye is preferably a compound represented by the formula (2-10) or a compound represented by the formula (2-11):

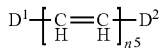
(2-10)

[in the formula (2-10), $D^1$ and $D^2$ each independently represent a group represented by any one of the formulas (2-10a) to (2-10d);

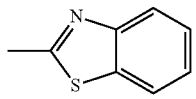
(2-10a)

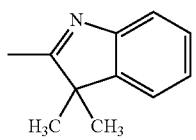
(2-10b)

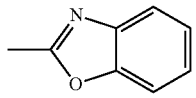
(2-10c)

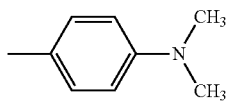
(2-10d)

and n5 represents an integer of 1 to 3.]

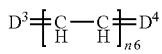
(2-11)

[in the formula (2-11), $D^3$ and $D^4$ each independently represent a group represented by any one of the formulas (2-11a) to (2-11h);

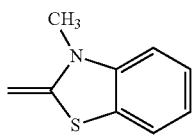
(2-11a)

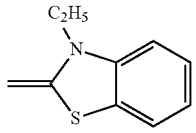
(2-11b)

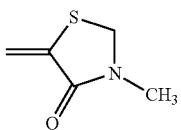
(2-11c)

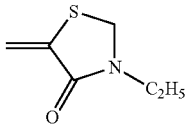
(2-11d)

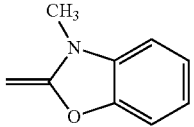
(2-11e)

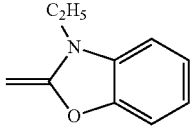
(2-11f)

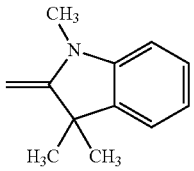
(2-11g)

(2-11h)

and n6 represents an integer of 1 to 3.].

From the viewpoint of improvement of orientation of the dichromic dye, the content of the dichromic dye in the composition for forming the polarization film is preferably 0.1 parts by mass or more and 30 parts by mass or less, more preferably 0.1 parts by mass or more and 20 parts by mass or less, further preferably 0.1 parts by mass or more and 10 parts by mass or less, and particularly preferably 0.1 parts by mass or more and 5 parts by mass or less based on 100 parts by mass solid matter of the composition for forming the polarization film. Herein, the solid matter means the total amount of the components of the composition for forming the polarization film excluding the solvent.

The composition for forming the polarization film may contain a polymerizable liquid crystal compound, a solvent, a polymerization initiator, a sensitizer, a polymerization inhibitor, a leveling agent, a polymerizable non-liquid crystal compound, and the like. It is preferable to contain a polymerizable liquid crystal compound. An elongate polarization film containing a polymerizable liquid crystal compound is provided with improved strength and lessened irregular color.

<Polymerizable Liquid Crystal Compound>

A polymerizable liquid crystal compound is a compound having a polymerizable group and showing a liquid crystal property.

The polymerizable group means a group relevant to polymerization reaction and is preferably a photo-polymerizable group. Herein, the photo-polymerizable group is a group capable of causing polymerization reaction by active radicals or acids generated from a photo-polymerization initiator described below. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Among them, an acryloyloxy group, a methacryloyloxy group, a vinyloxy group, an oxiranyl group, and an oxetanyl group are preferable, and an acryloyloxy group is more preferable. The compound showing a liquid crystal property may be a thermotropic liquid crystal or a lyotropic liquid crystal, or may be a nematic liquid crystal or a smectic liquid crystal in the thermotropic liquid crystal.

The polymerizable liquid crystal compound is preferably a smectic liquid crystal compound, and more preferably a higher order smectic liquid crystal compound in terms of attaining higher polarization properties. Especially, more preferable is a higher order smectic liquid crystal compound forming smectic B phase, smectic D phase, smectic E phase, smectic F phase, smectic G phase, smectic H phase, smectic I phase, smectic J phase, smectic K phase, or smectic L phase; and further preferable is a higher order smectic liquid crystal compound forming smectic B phase, smectic F phase, or smectic I phase. If a crystal liquid phase which is formed by the polymerizable liquid crystal compound is such a higher order smectic phase, a polarization film with higher degree of orientational order can be produced. Further, an elongate polarization film with high degree of orientational order shows Bragg peak derived from a higher order structure such as hexatic phase or crystal phase in x-ray diffractometry. The Bragg peak is a peak derived from the periodic structure of molecular orientation, and if a liquid crystal phase which is formed by the polymerizable liquid crystal compound is such a higher order smectic phase, it is possible to obtain a film with a periodic interval of 3.0 to 6.0 angstroms.

Specifically, examples of such a compound include compounds represented by the following formula (B) (hereinafter, may be referred to as compound (B)). The polymerizable liquid crystal compounds may be used alone or in combination.

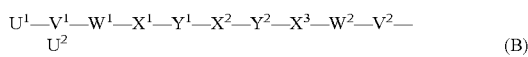
(B)

[In the formula (B), $X^1$, $X^2$, and $X^3$ each independently represent an optionally substituted 1,4-phenylene group or an optionally substituted cyclohexane-1,4-diyl group, provided that at least one of $X^1$, $X^2$, and $X^3$ is an optionally substituted 1,4-phenylene group; —$CH_2$— constituting the cyclohexane-1,4-diyl group may be substituted with —O—, —S—, or —NR—; R represents a $C_{1-6}$ alkyl or phenyl group;

$Y^1$ and $Y^2$ each independently represent —$CH_2CH_2$—, —$CH_2O$—, —COO—, —OCOO—, a single bond, —N=N—, —$CR^a$=$CR^b$—, —C≡C—, or —$CR^a$=N—; $R^a$ and $R^b$ each independently represent a hydrogen atom or a $C_{1-4}$ alkyl group;

$U^1$ represents a hydrogen atom or a polymerizable group;

$U^2$ represents a polymerizable group;

$W^1$ and $W^2$ each independently represent a single bond, —O—, —S—, —COO—, or —OCOO—;

$V^1$ and $V^2$ each independently represent an optionally substituted $C_{1-20}$ alkanediyl group; and —$CH_2$— constituting the alkanediyl group may be substituted with —O—, —S—, or —NH—.]

In the compound (B), at least one of $X^1$, $X^2$, and $X^3$ is preferably an optionally substituted 1,4-phenylene group.

The optionally substituted 1,4-phenylene group is preferably an unsubstituted group. The optionally substituted cyclohexane-1,4-diyl group is preferably an optionally substituted trans-cyclohexane-1,4-diyl group, and the optionally substituted trans-cyclohexane-1,4-diyl group is preferably an unsubstituted group.

Examples of a substituent group optionally included in the optionally substituted 1,4-phenylene group or the optionally substituted cyclohexane-1,4-diyl group include $C_{1-4}$ alkyl groups such as a methyl group, an ethyl group, and a butyl group; a cyano group; and a halogen atom.

$Y^1$ is preferably —$CH_2CH_2$—, —COO—, or a single bond; and $Y^2$ is preferably —$CH_2CH_2$— or —$CH_2O$—.

$U^2$ is a polymerizable group. $U^1$ is a hydrogen atom or a polymerizable group, and preferably a polymerizable group. Both of $U^1$ and $U^2$ are preferably polymerizable groups, and preferably photo-polymerizable groups. A polymerizable liquid crystal compound having a photo-polymerizable group is advantageous in that the liquid crystal compound can be polymerized in lower temperature conditions.

The polymerizable groups represented by $U^1$ and $U^2$ may be each independently different, but are preferably the same. Examples of the polymerizable groups include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Among them, an acryloyloxy group, a methacryloyloxy group, a vinyloxy group, an oxiranyl group, and an oxetanyl group are preferable, and an acryloyloxy group is more preferable.

Examples of the alkanediyl groups represented by $V^1$ and $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,14-diyl group, and an icosane-1,20-diyl group. $V^1$ and $V^2$ are preferably a $C_{2-12}$ alkanediyl group, and more preferably a $C_{6-12}$ alkanediyl group.

Examples of a substituent group optionally included in the optionally substituted $C_{1-20}$ alkanediyl group include a cyano group and a halogen atom, but the alkanediyl group is preferably an unsubstituted group, and more preferably an unsubstituted and linear alkanediyl group.

$W^1$ and $W^2$ are each independently and preferably a single bond or —O—.

Specific examples of the compound (B) include compounds represented by the formulas (1-1) to (1-23). When the compound (B) has a cyclohexane-1,4-diyl group, the cyclohexane-1,4-diyl group is preferably a trans isomer.

(1-1)
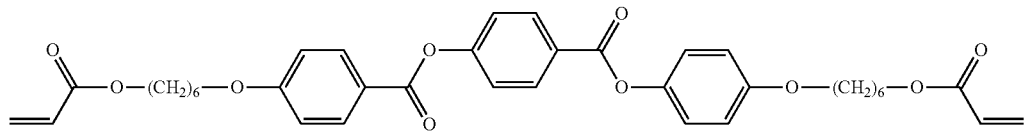
(1-2)
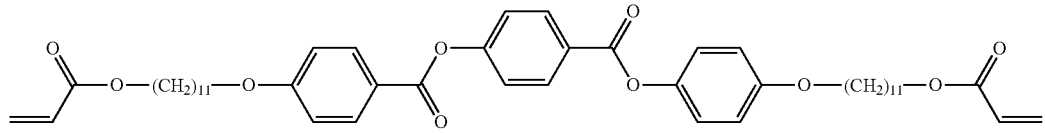
(1-3)
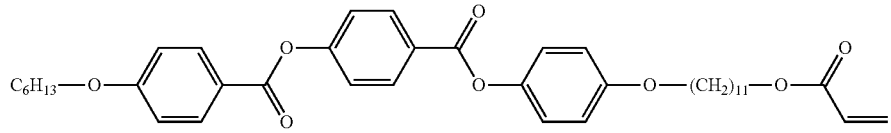
(1-4)
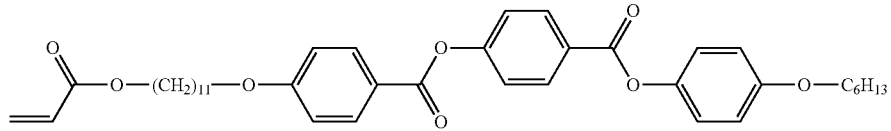
(1-5)
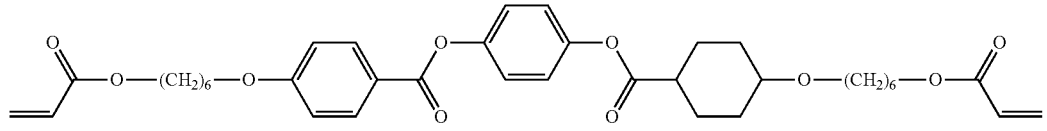
(1-6)
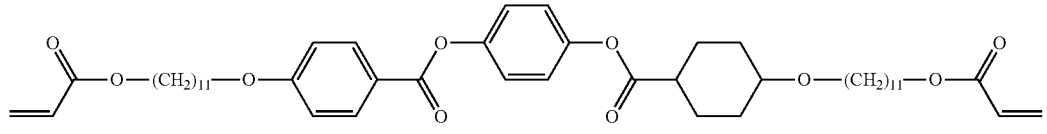
(1-7)
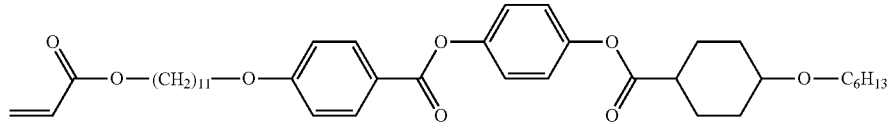
(1-8)
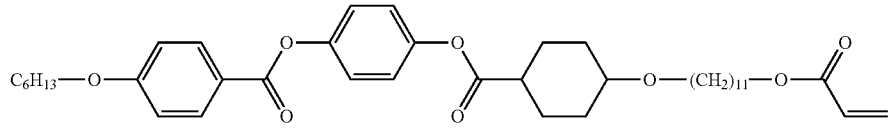
(1-9)
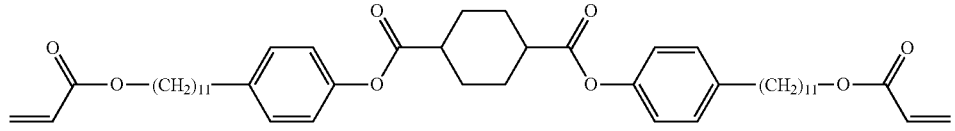
(1-10)
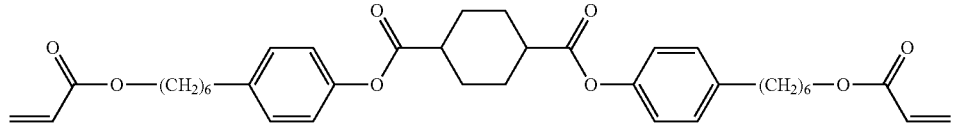
(1-11)
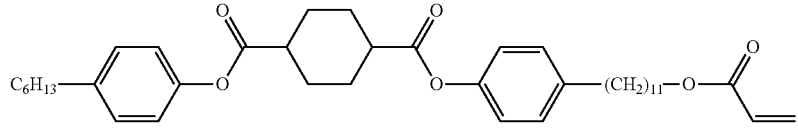

-continued
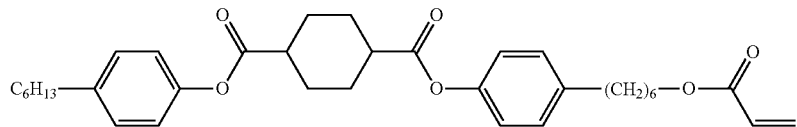
(1-12)
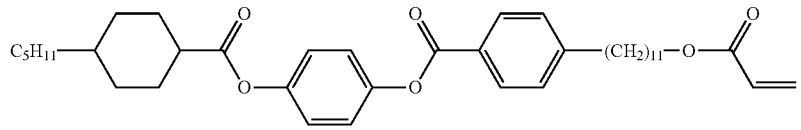
(1-13)
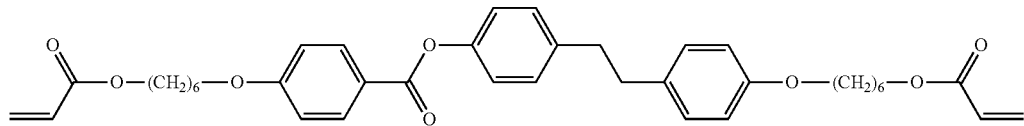
(1-14)
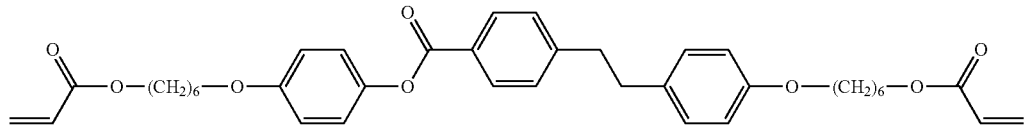
(1-15)
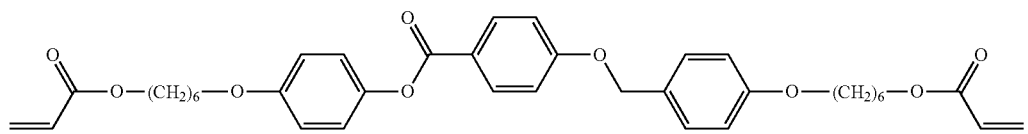
(1-16)
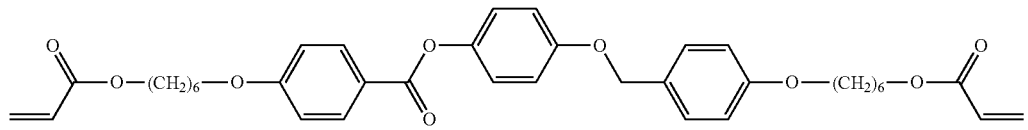
(1-17)
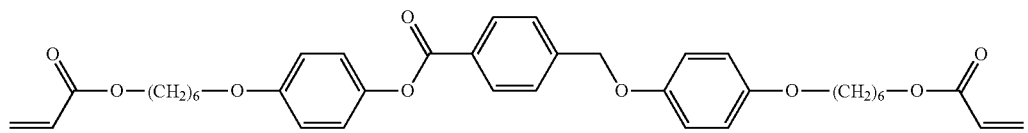
(1-18)
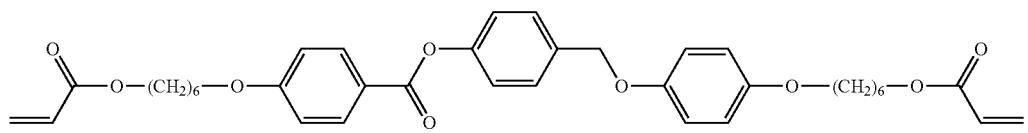
(1-19)
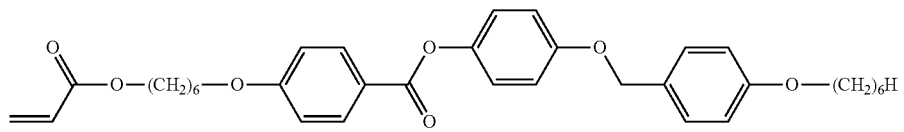
(1-20)
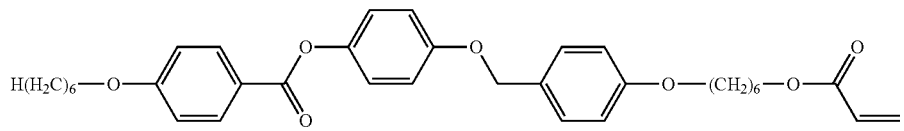
(1-21)
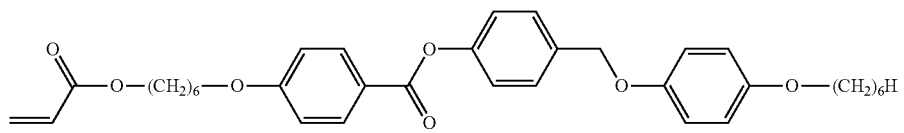
(1-22)

-continued (1-23)

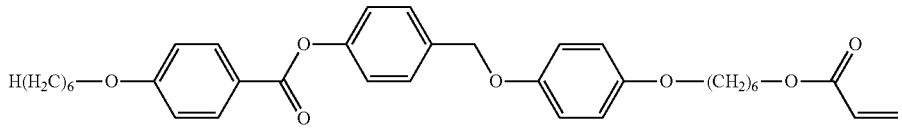

Among the compounds (B) exemplified above, preferable is at least one compound selected from the group consisting of the compounds represented by the formula (1-2), the formula (1-3), the formula (1-4), the formula (1-6), the formula (1-7), the formula (1-8), the formula (1-13), the formula (1-14), and the formula (1-15).

The compounds (B) exemplified above may be used alone or in combination for an elongate polarization film. When two or more kinds of polymerizable liquid crystal compounds are used in combination, it is preferable that at least one kind compound is the compound (B), and it is more preferable that two or more kind compounds are the compound (B). Combination of the compounds may make it possible to temporarily keep the liquid crystal property even at a temperature equal to or less than the liquid crystal-crystal phase transition temperature. The mixing ratio in the case of combination of two kind polymerizable liquid crystal compounds is usually 1:99 to 50:50, preferably 5:95 to 50:50, and more preferably 10:90 to 50:50.

The compound (B) is produced by, for example, a conventionally known method described in Lub et al. Recl. Tray. Chim. Pays-Bas, 115, 321-328 (1996), Japanese Patent No. 4719156, or the like.

From the viewpoint of improvement of orientation of the polymerizable liquid crystal compound, the content of the polymerizable liquid crystal compound in the composition for forming the polarization film is usually 70 to 99.5 parts by mass, preferably 80 to 99 parts by mass, more preferably 80 to 94 parts by mass, and further preferably 80 to 90 parts by mass based on 100 parts by mass solid matter of the composition for forming the polarization film.

<Solvent>

A solvent is preferably a solvent which can completely dissolve the polymerizable liquid crystal compound therein and which is inactive on the polymerization reaction of the polymerizable liquid crystal compound.

Examples of the solvent include alcohol solvents such as methanol, ethanol, ethylene glycol, isopropyl alcohol, propylene glycol, ethylene glycol methyl ether, ethylene glycol butyl ether, and propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, 2-heptanone, and methyl isobutyl ketone; aliphatic hydrocarbon solvents such as pentane, hexane, and heptane; aromatic hydrocarbon solvents such as toluene and xylene; nitrile solvents such as acetonitrile; ether solvents such as tetrahydrofuran and dimethoxyethane; chlorine-containing solvents such as chloroform and chlorobenzene; and the like. These solvents may be used alone or in combination.

The content of the solvent is preferably 50 to 98 mass in the total amount of the composition for forming the polarization film. In other words, the amount of the solid matter in the composition for forming the polarization film is preferably 2 to 50 mass %. If the amount of the solid matter is 50 mass % or less, the viscosity of the composition for forming the polarization film is lowered so that the thickness of the polarization film can be made approximately uniform, and thus the polarization film tends to be hardly uneven. The amount of the solid matter can be determined in consideration of the thickness of the polarization film to be produced.

<Polymerization Initiator>

A polymerization initiator is a compound which can cause polymerization reaction of a polymerizable liquid crystal compound or the like. The polymerization initiator is preferably a photo-polymerization initiator which can generate active radicals by light action.

Examples of the polymerization initiator include benzoin compounds, benzophenone compounds, alkylphenone compounds, acylphosphine oxide compounds, triazine compounds, iodonium salts, and sulfonium salts.

Examples of the benzoin compounds include bezoin, bezoin methyl ether, bezoin ethyl ether, bezoin isopropyl ether, and bezoin isobutyl ether.

Examples of the benzophenone compounds include benzophenone, methyl o-benzoylbenzoate, 4-phenylbenzophenone, 4-benzoyl-4'-methyldiphenyl sulfide, 3,3',4,4'-tetra (tert-butylperoxycarbonyl)benzophenone, and 2,4,6-trimethylbenzophenone.

Examples of the alkylphenone compounds include diethoxyacetophenone, 2-methyl-2-morpholino-1-(4-methylthiophenyl)propan-1-one, 2-benzyl-2-dimethylamino-1-(4-morpholinophenyl)butan-1-one, 2-hydroxy-2-methyl-1-phenylpropan-1-one, 1,2-diphenyl-2,2-dimethoxyethan-1-one, 2-hydroxy-2-methyl-1-[4-(2-hydroxyethoxy)phenyl] propan-1-on e, 1-hydroxycyclohexyl phenyl ketone, and 2-hydroxy-2-methyl-1-[4-(1-methylvinyl)phenyl]propan-1-one.

Examples of the acylphosphine oxide compounds include 2,4,6-trimethylbenzoyldiphenylphosphine oxide and bis(2, 4,6-trimethylbenzoyl)phenylphosphine oxide.

Examples of the triazine compounds include 2,4-bis (trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl) ethenyl]-1,3,5-triazine, 2,4-bis(trichloromethyl)-6-[2-(4-diethylamino-2-methylphenyl) ethenyl]-1,3,5-triazine, and 2,4-bis(trichloromethyl)-6-[2-(3,4-dimethoxyphenyl)ethenyl]-1,3,5-triazine.

Commercially available polymerization initiator may be used. Examples of the commercially available polymerization initiators include Irgacure (registered trademark) 907, 184, 651, 819, 250, and 369 (manufactured by BASF Japan); SEIKUOL (registered trademark) BZ, Z, and BEE (manufactured by Seiko Chemical Co., Ltd.); Kayacure (registered trademark) BP100 and UVI-6992 (manufactured by The Dow Chemical Company); ADEKA OPTOMER SP-152 and SP-170 (manufactured by ADEKA); TAZ-A and TAZ-PP (manufactured by DKSH Japan); and TAZ-104 (manufactured by Sanwa Chemical Co., Ltd.).

When the polymerizable liquid crystal compound is contained in the composition for forming the polarization film, the polymerization initiator is preferably contained in the composition for forming the polarization film. When the polymerizable liquid crystal compound is contained in the composition for forming the polarization film, the content of the polymerization initiator in the composition for forming the polarization film is usually 0.1 to 30 parts by mass, preferably 0.5 to 10 parts by mass, and more preferably 0.5 to 8 parts by mass based on 100 parts by mass content of the polymerizable liquid crystal compound, from the viewpoint of hardly causing orientation disorder for the polymerizable liquid crystal compound.

<Sensitizer>

A sensitizer is preferably a photosensitizer. Examples of the sensitizer include xanthone compounds such as xanthone and thioxanthone (e.g., 2,4-diethylthioxanthone and 2-isopropylthioxanthone); anthracene compounds such as anthracene and alkoxy group-containing anthracene (e.g., dibutoxyanthracene); phenothiazine and rubrene.

When the polymerizable liquid crystal compound is contained in the composition for forming the polarization film, the sensitizer is preferably contained in the composition for forming the polarization film. When the polymerizable liquid crystal compound is contained in the composition for forming the polarization film, the content of the sensitizer in the composition for forming the polarization film is usually 0.1 to 30 parts by mass, preferably 0.5 to 10 parts by mass, and more preferably 0.5 to 8 parts by mass based on 100 parts by mass content of the polymerizable liquid crystal compound.

<Polymerization Inhibitor>

Examples of the above-mentioned polymerization inhibitor include radical scavengers such as hydroquinone, alkoxy group-containing hydroquinone, alkoxy group-containing catechol (e.g., butylcatechol), pyrogallol, 2,2,6,6-tetramethyl-1-piperidinyl oxyradical; thiophenols; β-naphthylamines; and β-naphthols.

When the polymerizable liquid crystal compound is contained in the composition for forming the polarization film, the polymerization inhibitor is preferably contained in the composition for forming the polarization film. The polymerization inhibitor can control the promotion degree of the polymerization reaction of the polymerizable liquid crystal compound.

When the polymerizable liquid crystal compound is contained in the composition for forming the polarization film, the content of the polymerization initiator in the composition for forming the polarization film is usually 0.1 to 30 parts by mass, preferably 0.5 to 10 parts by mass, and more preferably 0.5 to 8 parts by mass based on 100 parts by mass content of the polymerizable liquid crystal compound.

<Leveling Agent>

A leveling agent has a function of adjusting the fluidity of the composition for forming the polarization film and making the applied layer of the composition for forming the polarization film flatter. Examples thereof may include surfactants. Examples of a preferable leveling agent include a leveling agent containing a polyacrylate compound as a main component and a leveling agent containing a fluorine-containing compound as a main component.

Examples of the leveling agent containing a polyacrylate compound as a main component include BYK-350, BYK-352, BYK-353, BYK-354, BYK-355, BYK-358N, BYK-361N, BYK-380, BYK-381, and BYK-392 (manufactured by BYK Chemie).

Examples of the leveling agent containing a fluorine-containing compound as a main component include Megafac (registered trademark) R-08, R-30, R-90, F-410, F-411, F-443, F-445, F-470, F-471, F-477, F-479, F-482, F-483 (manufactured by DIC Corporation); SURFLON (registered trademark) S-381, S-382, S-383, S-393, SC-101, SC-105, KH-40, and SA-100 (manufactured by AGC Seimi Chemical Co., Ltd.); E1830 and E5844 (manufactured by Daikin Fine Chemical Co., Ltd.); and EFTOP EF301, EF303, EF351, and EF352 (manufactured by Mitsubishi Materials Electronic Chemicals Co., Ltd.).

When the polymerizable liquid crystal compound is contained in the composition for forming the polarization film, the leveling agent is preferably contained in the composition for forming the polarization film. The content of the leveling agent in the composition for forming the polarization film is usually 0.3 parts by mass or more and 5 parts by mass or less, and preferably 0.5 parts by mass or more and 3 parts by mass or less based on 100 parts by mass content of the polymerizable liquid crystal compound.

If the content of the leveling agent is within the above-mentioned range, it is made easy to horizontally align the polymerizable liquid crystal compound, and the elongate polarization film to be obtained tends to be smoother, and therefore it is preferable. If the content of the leveling agent to the polymerizable liquid crystal compound exceeds the above-mentioned range, the elongate polarization film to be obtained tends to be uneven, and therefore it is not preferable. The composition for forming the polarization film may contain two or more kinds of leveling agents.

<Polymerizable Non-Liquid Crystal Compound>

The composition for forming the polarization film may contain a polymerizable non-liquid crystal compound. Addition of a polymerizable non-liquid crystal compound can increase the crosslink density of the polymerization reactive point and improve strength of the elongate polarization film.

The polymerizable non-liquid crystal compound preferably contains at least one polymerizable group among the group consisting of an acryloyl group, a methacryloyl group, and an isocyanato group, more preferably contains 2 or more and 10 or less polymerizable groups, and further preferably contains 3 or more and 8 or less polymerizable groups.

The content of the polymerizable non-liquid crystal compound in the composition for forming the polarization film is usually 0.1 to 30 parts by mass, and preferably 0.5 to 10 parts by mass based on 100 parts by mass solid matter of the composition for forming the polarization film.

<Second Applied Layer>

A second applied layer is formed by continuously applying the composition for forming the polarization film onto the elongate orientation film.

Examples of the method for continuously applying the composition for forming the polarization film onto the elongate orientation film include those which are the same as the methods for applying the composition for forming the orientation film. When the dichromic dye has a lyotropic liquid crystal property, the dichromic dye can be aligned by application with shearing force application.

<Second Dried Layer>

A second dried layer is formed by drying the second applied layer. In the present specification, the second dried layer means those in which the content of the solvent in the second applied layer is lowered to 50 mass % or less in the entire mass of the second applied layer. The content of the solvent is preferably 30 mass % or less, more preferably 10 mass % or less, further preferably 5 mass % or less, and particularly preferably 1 mass % or less.

Examples of the method for drying the second applied layer include those which are the same as the methods for drying the first applied layer. The second applied layer is heat-dried to transfer the dichromic dye and the polymerizable liquid crystal compound to the liquid crystal phase so that the dichromic dye and the polymerizable liquid crystal compound are usually aligned.

When the dichromic dye and the polymerizable liquid crystal compound contained in the second dried layer after the drying do not form the liquid crystal phase, the liquid crystal phase can be formed by heating the second dried layer to a temperature at which these compounds show the liquid crystal phase. The dichromic dye and the polymerizable liquid crystal compound contained in the second dried layer may be heated to a temperature equal to or higher than the temperature at which these compounds are transferred to the solution state, and then cooled to a temperature at which the dichromic dye and the polymerizable liquid crystal compound show the liquid crystal phase to form the liquid crystal phase.

The above-mentioned drying and the above-mentioned heating for forming the liquid crystal phase may be performed in the same heating process.

<Elongate Polarization Film>

The second dried layer may be used as it is as an elongate polarization film, but is preferably cured when the polymerizable liquid crystal compound is contained in the second dried layer. Curing means to polymerize the polymerizable liquid crystal compound contained in the second dried layer. Examples of the polymerization method include heating and irradiation with light, and preferably irradiation with light. Owing to the curing, the dichromic dye contained in the second dried layer can be fixed in an aligned state.

The curing is preferably performed in the state where the liquid crystal phase is formed in the polymerizable liquid crystal compound, and the curing may be performed by irradiation with light at a temperature at which the liquid crystal phase is formed.

Examples of the light for irradiation with light include visible light, ultraviolet rays, and laser beam. Ultraviolet rays are preferable because of easiness of handling. The second dried layer may be irradiated with light directly or through the elongate substrate.

Examples of a light source for the irradiation with light include a xenon lamp, a high pressure mercury lamp, an extra high pressure mercury lamp, a metal halide lamp, and ultraviolet laser of KrF or ArF. Preferable are a high pressure mercury lamp, an extra high pressure mercury lamp, and a metal halide lamp. These lamps are preferable since the emission intensity of ultraviolet rays with a wavelength of 313 nm is high.

The thickness of the elongate polarization film is usually 5 µm or less, preferably 0.5 µm or thicker and 3 µm or less, and more preferably 1 µm or thicker and 3 µm or less. The thickness of the elongate polarization film can be measured by an interference thickness meter, a laser microscope, or a contact-type thickness meter.

The elongate polarization film preferably exhibits Bragg peak in x-ray diffractometry.

<Elongate Polarizer Plate>

Consequently, it is possible to obtain an elongate polarizer plate having an elongate substrate and an elongate polarization film, wherein the direction of orientation regulating force of the elongate orientation film is 45°±15° to the longitudinal direction of the elongate substrate, and the direction of absorption axis of the elongate polarization film is at 45°±15° relative to the longitudinal direction of the elongate substrate and is parallel to the direction of the orientation regulating force.

In the elongate polarizer plate, the direction of the absorption axis of the elongate polarization film is 45°±10°, preferably 45°±5°, and more preferably 45°±1° relative to the longitudinal direction of the elongate substrate. As the direction of the absorption axis of the elongate polarization film is closer to 45°, the plate obtained by layering the elongate polarization film and an elongate retardation plate shows higher ellipticity.

An elongate circularly polarizing plate can be produced by integrally laminating (sticking) an elongate retardation plate as the elongate substrate with the elongate polarizer plate of the present invention.

A polarizer plate can be obtained by cutting the obtained elongate polarizer plate into a sheet-like form. A circularly polarizing plate can be obtained by cutting out the elongate circularly polarizing plate into a sheet-like form.

It is preferable to obtain a polarizer plate or a circularly polarizing plate by cutting out the elongate polarizer plate or the elongate circularly polarizing plate into a rectangular form with the longer sides thereof forming an angle of 0° or 90° relative to the longitudinal direction of the elongate substrate. A term of "a rectangular form having the long sides thereof forming an angle of 0° relative to the direction of the elongate substrate" means a rectangular which the direction of the longer side thereof corresponds to the longitudinal direction of the elongate substrate. A term of "a rectangular form having the long sides thereof forming an angle of 90 relative to the direction of the elongate substrate" means a rectangular which the direction of the shorter side thereof corresponds to the longitudinal direction of the elongate substrate.

The sheet-like form excludes those with considerably different balance between the longer direction and the shorter direction of the plate, and in the present specification, if the length in the longitudinal direction is equal to or less than 5 times the length in the shorter direction, this case satisfies the sheet-like form.

An arbitrary method may be employed for the cutting.

The haze value of the elongate polarizer plate of the present invention is usually 2% or less, preferably 1% or less, and more preferably 0.5% or less. As the haze value is lower, the transparency is higher.

The luminous degree of polarization (Py) of the elongate polarizer plate of the prevent invention is usually 80% or more, preferably 90% or more, and more preferably 95% or more. If Py is 80% or more, the black luminance is lowered; that is, the contrast is improved so that it is preferable.

The luminous transmittance (Ty) of the elongate polarizer plate of the present invention is 35% or more, preferably 40% or more, and more preferably 42% or more. If Ty is 35% or more, the white luminance is improved so that it is preferable. Herein, the transmittance includes the interface reflection loss due to the refractive index difference in the interface of the substrate film and the air and the loss due to the absorption of the substrate film itself. Further, when the polarizer plate is provided with an anti-glaring function by an anti-glaring treatment or the like, the transmittance means a value measured by integrating sphere including the scattered light.

The chromaticity (single body a) in the Lab color system of the elongate polarizer plate of the present invention is usually 0±5, preferably 0±3, more preferably 0±2, and further preferably 0±1. The chromaticity (single body b) in the Lab color system is usually 0±5, preferably 0±3, more preferably 0±2, and further preferably 0±1. If the chromaticity is closer to 0, neutral chromaticity is provided so that it is preferable in terms of improvement of color reproducibility at the time of white display.

The ellipticity of the elongate polarizer plate having the elongate polarization film and the elongate retardation plate in the present invention, and the ellipticity of the elongate circularly polarizing plate having the elongate retardation plate are ideally closer to 100% in the entire range visible light, but it is difficult from the viewpoint of wavelength dispersion. Consequently, it is important that the ellipticity is high in a range of wavelength with high luminosity factor in terms of the function of preventing outside light reflection. That is, it is preferable that the ellipticity is 50% or more in the entire range visible light and the ellipticity is 70% or more for the light with a wavelength of 550 nm. It is more preferable that the ellipticity is 60% or more in the entire range visible light and the ellipticity is 80% or more for the light with a wavelength of 550 nm, and it is further preferable that the ellipticity is 70% or more in the entire range visible light and the ellipticity is 90% or more for the light with a wavelength of 550 nm.

<Method for Continuously Producing Elongate Polarizer Plate>

The elongate polarizer plate of the present invention is usually produced continuously in a roll-to-roll manner. With reference to FIG. 1, one example of a main part of the method for continuously producing an elongate polarizer plate in a roll-to-roll manner will be described. FIG. 1 shows an example in which an elongate photo-orientation film is employed as the elongate orientation film, but the present invention is not limited to this example, and the above-mentioned other orientation films may be employed properly.

A first roll 210 having a first roll core 210A on which an elongate substrate is wound is commercially available. Examples of the elongate substrate commercially available in the form of a roll include films made of cellulose esters, cycloolefin-based resins, polyethylene terephthalate, and polymethacrylic acid esters among the elongate substrates already exemplified above.

Successively, the elongate substrate is unwound off from the first roll 210. The elongate substrate is unwound off by installing a proper rotating unit in the roll core 210A of the first roll 210 and rotating the first roll 210 by the rotating unit. The elongate substrate may be unwound off by installing a proper auxiliary roll 300 in the direction of transporting the elongate substrate from the first roll 210 and rotating the auxiliary roll 300. The elongate substrate may be further unwound off, while applying proper tension to the elongate substrate, by installing a rotating unit for the first roll core 210A and the auxiliary roll 300.

The elongate substrate unwound off from the first roll 210 is coated on its surface with a composition for forming a photo-orientation film by an application device 211A when passing through the application device 211A. The application device 211A which continuously applies the composition for forming the photo-orientation film as described above preferably employs a gravure coating method, a die coating method, or a flexo-method.

The elongate substrate on which the first applied layer is formed by passing through the application device 211A is transferred to a drying furnace 212A, and the first applied layer is dried in the drying furnace 212A to form a first dried layer. As the drying furnace 212A, a hot air drying furnace in combination of a forced-air drying method and a heat drying method is employed. The set temperature in the drying furnace 212A is determined depending on the kind of the solvent contained in the composition for forming the photo-orientation film, or the like. The drying furnace 212A may include a plurality of zones each having a different set temperature, or may be composed of a plurality of drying furnaces each having a different set temperatures and being arranged in series.

Figure 2:
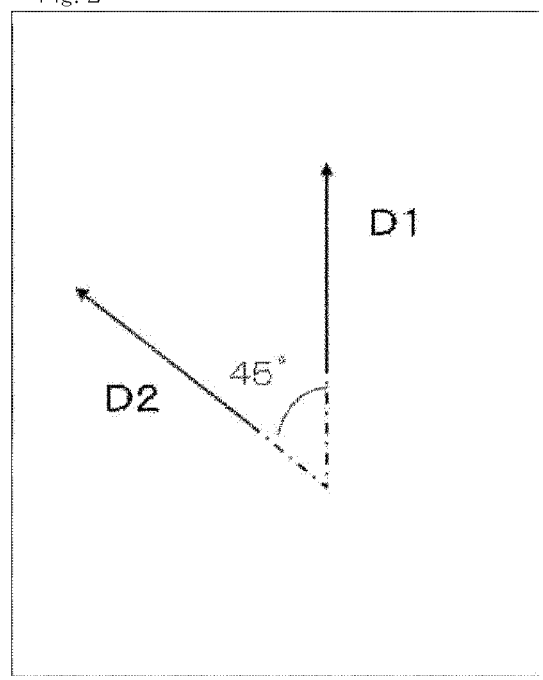
FIG. 2 is a schematic diagram showing a relation between a direction D2 of orientation regulating force of an elongate photo-orientation film and a longitudinal direction D1 of an elongate substrate.

The obtained first dried layer is irradiated with polarized light by a polarized light irradiation device 213A to obtain an elongate photo-orientation film. At this time, polarized light is irradiated in such a manner that the direction D2 of the orientation regulating force of the photo-orientation film oblique to the longitudinal direction D1 of the elongate substrate. FIG. 2 is a diagram schematically showing the case where a relation between the direction D2 of the orientation regulating force of the photo-orientation film formed after polarized light irradiation and the longitudinal direction D1 of the elongate substrate is at 45°. That is, FIG. 2 shows that when the longitudinal direction D1 of the elongate substrate and the direction D2 of the orientation regulating force of the photo-orientation film are observed in the surface of the elongate photo-orientation film after being passed through the polarized light radiation device 213A, the angle between these directions is 45°.

Successively, the elongate substrate on which the elongate photo-orientation film is formed passes an application device 211B. A composition for forming a polarization film (containing a polymerizable liquid crystal compound) is applied onto the elongate photo-orientation film by the application device 211B to form a second applied layer. Thereafter, when the elongate substrate passes through a drying furnace 212B, a second dried layer is formed. Similarly to the drying furnace 212A, the drying furnace 212B may include a plurality of zones each having a different set temperature, or may be composed of a plurality of drying furnaces each having a different set temperatures and being arranged in series.

When the elongate substrate passes through the drying furnace 212B, the polymerizable liquid crystal compound contained in the composition for forming the polarization film forms the liquid crystal phase, and the dichromic dye is aligned. When the polymerizable liquid crystal compound contained in the second dried layer is irradiated with light by a polarized light irradiation device 213B in the state where the polymerizable liquid crystal compound forms the liquid crystal phase, the polymerizable liquid crystal compound is polymerized, while keeping the liquid crystal phase, to form an elongate polarization film.

The elongate polarizer plate obtained in the above-mentioned manner is wound on a second roll core 220A to obtain a second roll 220. At the time of winding, a proper spacer may be used for winding the polarizer plate together.

As described above, an elongate polarizer plate can be produced continuously in a roll-to-roll manner by passing an elongate substrate from the first roll 210 through the application device 211A, the drying furnace 212A, the polarized light UV irradiation device 213A, the application device 211B, the drying furnace 212B, and the light irradiation device 213 in this order.

In the production method illustrated in FIG. 1, a method for continuously producing an elongate polarizer plate from an elongate substrate is shown, but the production may be performed by another method. For example, first, an elongate substrate may be unwound off from the first roll 210 and allowed to pass through the application device 211A, the drying furnace 212A, and the polarized light irradiation device 213A in this order, and then may be wound on a roll core to continuously produce a rolled elongate orientation plate, and then, the obtained rolled elongate orientation plate may be unwound off and allowed to pass through the application device 211B, the drying furnace 212B, and the light irradiation device 213B in this order to produce an elongate polarizer plate.

When an elongate polarizer plate is produced in the form of the second roll 220, the elongate polarizer plate may be unwound off from the second roll 220 and cut in a prescribed size, and then, a retardation plate may be stuck to the cut polarizer plate to produce a circularly polarizing plate. A third roll obtained by winding an elongate retardation plate on a roll core may be prepared to thereby continuously produce an elongate circularly polarizing plate.

Figure 3:
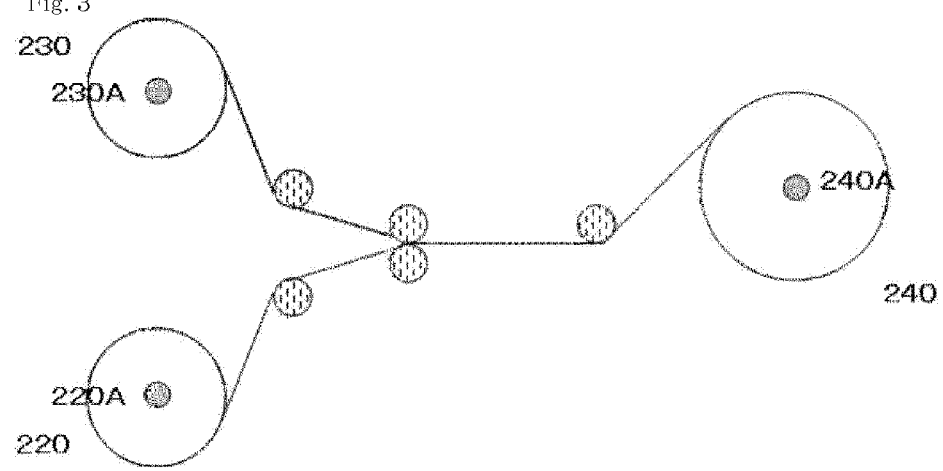
FIG. 3 is a schematic diagram showing a main part of a method for continuously producing an elongate circularly polarizing plate.

A method for continuously producing an elongate circularly polarizing plate will be described with reference to FIG. 3. The production method includes steps of:

unwinding off the elongate polarizer plate of the present invention continuously from the second roll 220, and at the same time, unwinding off an elongate retardation plate continuously from the third roll 230 on which the retardation plate is wound;

sticking the elongate polarizer plate and the elongate retardation plate continuously to obtain an elongate circularly polarizing plate; and winding the obtained elongate circularly polarizing plate on a fourth roll core 240A to obtain a forth roll 240. This method is so-called roll-to-roll lamination.

The elongate polarizer plate and the elongate retardation plate may be stuck to each other by using a proper adhesive.

The elongate polarizer plate of the present invention is cut if necessary and can be used for various kinds of display devices. The elongate polarizer plate of the present invention and a polarizer plate cut out of the elongate polarizer plate of the present invention may be stuck to a display device by usually using an adhesive or a pressure-sensitive adhesive. Preferably, the elongate polarizer plate of the present invention is continuously stuck to a display device, and more preferably continuously stuck to a plurality of display devices. A display device with the polarizer plate can be obtained by continuously sticking the elongate polarizer plate of the present invention to a display device.

The display device is a device having a display element and containing a light emitting element or a light emitting device as a light emitting source. Examples of the display device comprising the elongate polarizer plate of the present invention or the polarizer plate cut out of the elongate polarizer plate of the present invention include a liquid crystal display device, an organic electroluminescence (EL) display device, an inorganic electroluminescence (EL) display device, an electron emission display device (e.g., electric field emission display device (FED), surface-conduction electron-emitter display device (SED)), electronic paper (display devices using electronic ink and electrophoresis element, plasma display device, projection type display device (e.g., grating light valve (GLV) display device and a display device having a digital micro-mirror device (DMD)), and a piezoelectric ceramic display. The liquid crystal display device includes any of a transmission type liquid crystal display device, a semi-transmission type liquid crystal display device, a reflection type liquid crystal display device, a direct viewing type liquid crystal display device, and a projection type liquid crystal display device. These display devices may be display devices which display two-dimensional images or three-dimensional display devices which display three-dimensional images. The elongate polarizer plate of the present invention and the polarizer plate cut out of the elongate polarizer plate of the present invention are particularly effectively used for display devices such as an organic electroluminescence (EL) display device and an inorganic electroluminescence (EL) display device, as well as a display device having a touch panel.

EXAMPLES

Hereinafter, the present invention will be described more in detail by way of Examples. In Examples, "%" and "part(s)" mean mass % and part(s) by mass unless otherwise specified.

Example 1

Production of Composition for Forming a Photo-Orientation Film

The following components were mixed, and the obtained mixture was stirred at 80° C. for 1 hour to obtain a composition for forming a photo-orientation film. The following photo-orientation material having a photoreactive group was synthesized by the method described in JP 2013-33248 A. Photo-orientation material (2 parts):

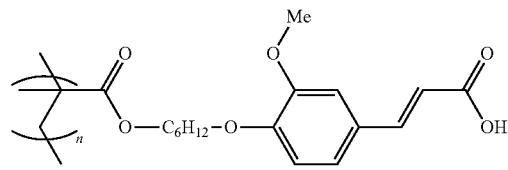

Solvent (98 parts): o-xylene
[Production of Composition for Forming a Polarization Film]

The following components were mixed and stirred at 80° C. for 1 hour to obtain a composition for forming a polarization film. As a dichromic dye, azo-based dyes described in Examples of JP-A 2013-101328 were used.

[Polymerizable liquid crystal compound]

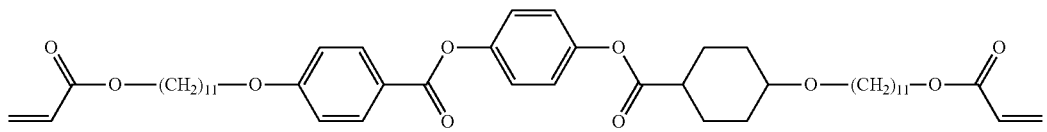

(1-6)

75 parts

-continued (1-7)

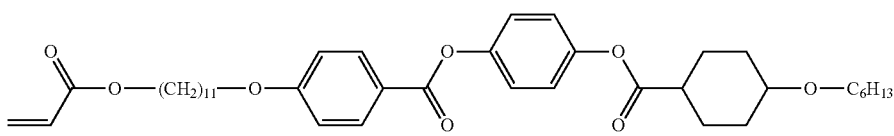

25 parts

[Dichromic dye]

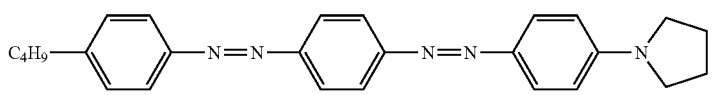

2.5 parts

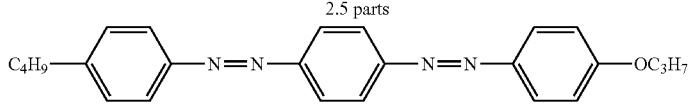

2.5 parts

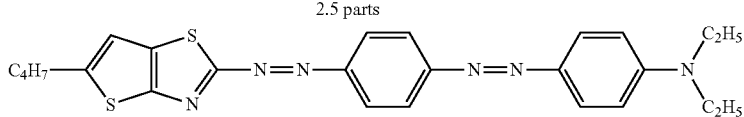

2.5 parts

[Other Components]

| | |
|---|---|
| Polymerization initiator; 2-dimethylamino-2-benzyl-1-(4-morpholinophenyl)butan-1-one (Irgacure 369; manufactured by BASF Japan) | 6 parts |
| Leveling agent; A polyacrylate compound (BYK-361N; manufactured by BYK-Chemie) | 1.2 parts |
| Solvent; o-xylene | 250 parts |

[Production of Elongate Polarizer Plate (1)]

A rolled elongate triacetyl cellulose film with a width of 640 mm (KC4UY-TAC manufactured by Konica Minolta, Inc.; 40 μm) was continuously unwound off at a speed of 8 m/minute, and the film surface was subjected to a plasma treatment, and then a composition for forming a photo-orientation film was discharged at a flow rate of 16 ml/minute by using a slot die coater to form a first applied layer in the 400 mm-wide center part of the film. Further, the resulting film was transported in a forced-air drying furnace set at 100° C. for 2 minutes to remove the solvent so that a first dried film was formed. Thereafter, the first dried film was irradiated with polarized UV rays at an intensity of 20 mJ/cm² (standard 313 nm) at 45° to the longitudinal direction of the film to provide orientation regulating force, so that an elongate photo-orientation film was formed. A composition for forming a polarization film was discharged at a flow rate of 24 ml/minute onto the obtained elongate photo-orientation film by using a slot die coater to form a second applied layer in the 400 mm-wide center part of the film. The resulting film was transported in a forced-air drying furnace set at 110° C. for 2 minutes to remove the solvent so that a second dried film was formed. Thereafter, the second dried film was irradiated with UV rays at an intensity of 1000 mJ/cm² (standard 365 nm) to cure the polymerizable liquid crystal compound contained in the second dried film, so that an elongate polarization film was formed. Then, the resulting film was continuously wound in a rolled state to obtain an elongate polarizer plate (1) with 200 m having an absorption axis in the 45° direction.

[Evaluation of Elongate Polarizer Plate (1)]

Five polarizer plates each having a 5 cm-square were cut out of the obtained elongate polarizer plate (1) in the width direction at the position of 3 m from the application start portion and at the position of 3 m from the application termination portion.

[Measurement of Polarization Degree/Transmittance]

The polarization degree and the transmittance were measured as follows in order to confirm the usefulness of the elongate polarizer plate of the present invention. The transmittance ($T^1$) in the transmission axis direction and the transmittance ($T^2$) in the absorption axis direction were measured by a double beam method in 2 nm-steps from 380 to 680 nm wavelength ranges using a spectrophotometer (UV-3150, manufactured by Shimadzu Corporation) to which a polarizer-bearing holder was set. The single body transmittance and the polarization degree were calculated according to the following formulas (1) and (2) using the measured values of the transmittance ($T^1$) in the transmission axis direction and the transmittance ($T^2$) in the absorption axis direction at each wavelength, and visual sensitivity correction was performed in 2-degree visual field (C light source) standardized in JIS Z 8701 to calculate the luminous degree of polarization (Py), the luminous transmittance (Ty), and chromaticities (of single body a and single body b) in Lab color system. The measurement results are shown in Table 1.

Single body transmittance (%)=$(T^1+T^2)/2$ formula (1)

Polarization degree (%)=$\{(T^1-T^2)/(T^1+T^2)\}\times 100$ formula (2)

[Measurement of Haze Value]

The haze value was measured using a haze meter (HZ-2; manufactured by Suga Test Instruments Co., Ltd.) in order to confirm the transparency of the elongate polarizer plate of the present invention. The measurement results are shown in Table 1.

[Thickness Measurement]

After the polarizer plate was cut by a microtome, carbon was vapor-deposited on the cut cross section, and the cross section was observed by a scanning transmission electron microscope (STEM, electric field emission type scanning transmission electron microscope (FE-STEM), model: "S-5500", manufactured by Hitachi Ltd.) to find that the thickness of the photo-orientation film was 100 nm and the thickness of the polarization film was 2.1 µm.

TABLE 1

| Elongate polarizer plate (1) | | Polarizer film | | | | |
|---|---|---|---|---|---|---|
| | | 1 | 2 | 3 | 4 | 5 |
| 3 m from application start portion | Haze value | 0.4% | 0.3% | 0.4% | 0.5% | 0.4% |
| | Py | 96% | 96% | 95% | 96% | 95% |
| | Ty | 43% | 42% | 43% | 42% | 43% |
| | Single body a | 0.2 | 0.2 | 0.2 | 0.2 | 0.2 |
| | Single body b | 0.4 | 0.3 | 0.3 | 0.2 | 0.2 |
| 3 m from application termination portion | Haze value | 0.4% | 0.3% | 0.3% | 0.4% | 0.3% |
| | Py | 96% | 96% | 95% | 96% | 95% |
| | Ty | 43% | 43% | 43% | 43% | 43% |
| | Single body a | 0.2 | 0.1 | 0.2 | 0.2 | 0.3 |
| | Single body b | 0.3 | 0.6 | 0.5 | 0.3 | 0.0 |

It was confirmed from the results in Table 1 that a polarizer plate having high transparency, high polarizing performance, and neutral hue can be produced in the form of a 200 m roll uniform in the width direction and in the longitudinal direction.

Example 2

Production of Elongate Polarizer Plate (2)

An elongate polarizer plate (2) with 200 m was produced in the same manner as in Example 1, except that the application flow rate of the composition for forming the polarization film was set to 35.5 ml/minute.

[Evaluation of Elongate Polarizer Plate (2)]

The measurement of the polarization degree/transmittance and the measurement of the haze value were performed similarly in the case of the elongate polarizer plate (1). The results are shown in Table 2. The thickness was also measured similarly in the case of the elongate polarizer plate (1) to find that the thickness of the photo-orientation film of the elongate polarizer plate (2) was 100 nm and the thickness of the polarization film was 2.5 µm.

TABLE 2

| Elongate polarizer plate (2) | | Polarizer plate | | | | |
|---|---|---|---|---|---|---|
| | | 1 | 2 | 3 | 4 | 5 |
| 3 m from application start portion | Haze value | 0.5% | 0.4% | 0.4% | 0.5% | 0.4% |
| | Py | 98% | 98% | 98% | 98% | 97% |
| | Ty | 42% | 42% | 41% | 41% | 41% |
| | Single body a | 0.2 | 0.2 | 0.1 | 0.1 | 0.2 |
| | Single body b | 1.1 | 1.2 | 1.3 | 1.4 | 1.3 |
| 3 m from application termination portion | Haze value | 0.4% | 0.3% | 0.5% | 0.4% | 0.4% |
| | Py | 97% | 98% | 98% | 97% | 98% |
| | Ty | 42% | 41% | 41% | 41% | 41% |
| | Single body a | 0.1 | 0.1 | 0.1 | 0.1 | 0.1 |
| | Single body b | 1.1 | 1.3 | 1.4 | 1.4 | 1.4 |

It was confirmed from the results in Table 2 that a polarizer plate having high transparency, high polarizing performance, and neutral hue can be produced in the form of a 200 m roll uniform in the width direction and in the longitudinal direction.

Example 3

Production of Elongate Polarizer Plate (3)

An elongate polarizer plate (3) with 200 m was obtained in the same manner as in Example 1, except that the rolled elongate triacetyl cellulose film with a width of 640 mm (KC4UY-TAC manufactured by Konica Minolta, Inc.; 40 µm) was changed to a rolled uniaxially stretched film WRF-S with a width of 640 mm (modified polycarbonate-based resin, thickness 50 µm).

A portion of the rolled WRF-S film was sampled, and the retardation (Re($\lambda$)) was measured using an automatic birefringence meter manufactured by Oji Scientific Instruments "KOBRA (registered trademark)". As a result, the following were found: Re(450.0)=131.0 nm, Re(498.6)=140.0 nm, Re(549.4)=144.5 nm, Re(587.7)=146.3 nm, Re(627.8)=147.3 nm, Re(751.3)=148.0 nm, and the slow axis direction was 0° (parallel direction) to the longitudinal direction of the film. The measurement results above were re-calculated by Cauchy approximation to obtain the following: Re(550)=144.6 nm and Re(650)=147.6 nm. That is, the rolled WRF-S film had optical characteristics represented by the following formulas (40), (50), and (51):

$$100 < Re(550) < 160 \tag{40}$$

$$Re(450)/Re(550) \leq 1.00 \tag{50}$$

$$1.00 \leq Re(650)/Re(550) \tag{51}$$

Herein, the Cauchy approximation formula was determined according to Re($\lambda$)=a+b/$\lambda^2$+c/$\lambda^4$+d/$\lambda^6$ from the actually measured values of the respective coefficients.

[Evaluation of Elongate Polarizer Plate (3)]

The measurement of the polarization degree/transmittance and the measurement of the haze value were performed similarly in the case of the elongate polarizer plate (1). The results are shown in Table 3. The measurement of the polarization degree/transmittance was performed by incident of polarized light for measurement from the polarization film side of each sample. The thickness was also measured similarly in the case of the elongate polarizer plate (1) to find that the thickness of the photo-orientation film of the elongate polarizer plate (3) was 100 nm and the thickness of the polarization film was 2.1 µm.

TABLE 3

| Elongate polarizer plate (3) | | Polarizer plate | | | | |
|---|---|---|---|---|---|---|
| | | 1 | 2 | 3 | 4 | 5 |
| 3 m from application start portion | Haze value | 0.4% | 0.5% | 0.5% | 0.6% | 0.4% |
| | Py | 96% | 96% | 95% | 96% | 95% |
| | Ty | 42% | 41% | 42% | 41% | 41% |
| | Single body a | 0.2 | 0.2 | 0.2 | 0.2 | 0.2 |
| | Single body b | 0.4 | 0.3 | 0.3 | 0.2 | 0.2 |
| 3 m from application termination portion | Haze value | 0.5% | 0.5% | 0.4% | 0.4% | 0.4% |
| | Py | 96% | 96% | 95% | 96% | 95% |
| | Ty | 42% | 42% | 42% | 41% | 42% |
| | Single body a | 0.2 | 0.1 | 0.2 | 0.2 | 0.3 |
| | Single body b | 0.3 | 0.6 | 0.4 | 0.3 | 0.0 |

It was confirmed from the results in Table 3 that a polarizer plate having high transparency, high polarizing performance, and neutral hue can be produced in the form of a 200 m roll uniform in the width direction and in the longitudinal direction.

[Measurement of Ellipticity]

In order to confirm the usefulness of the elongate polarizer plate (3) as a circularly polarizing plate, the angle of the absorption axis of the elongate polarization film to the longitudinal direction of the elongate polarizer plate (3), the angle between the absorption axis of the elongate polarization film and the slow axis of the film substrate (uniaxially stretched film WRF-S), and the ellipticity to the light with a wavelength of 450 nm, 550 nm, 588 nm, 628 nm, and 751 nm were measured for the respectively cut polarizer plates by using an automatic birefringence meter "KOBRA (registered trademark)" manufactured by Oji Scientific Instruments. Herein, the ellipticity means the ratio of short axis/long axis of the circularly polarized light. Specifically, the ellipticity is 100% in the case of completely circularly polarized light, and the ellipticity is 0% in the case of linearly polarized light. As having ellipticity closer to 100% for each wavelength, the circularly polarizing plate is superior and more excellent in reflection prevention property. The measurement results are shown in Table 4.

TABLE 4

| Elongate polarizer plate (3) | | Polarizer plate | | | | |
|---|---|---|---|---|---|---|
| | | 1 | 2 | 3 | 4 | 5 |
| 3 m from application start portion | Angle of absorption axis of elongate polarization film φp (°) | 45.0 | 45.1 | 45.1 | 45.0 | 45.0 |
| | Angle between absorption axis of elongate polarization film and slow axis of film substrate Ψ (°) | 44.7 | 45.0 | 45.4 | 45.2 | 45.2 |
| | Ellipticity 450 nm | 78% | 78% | 78% | 79% | 79% |
| | Ellipticity 550 nm | 93% | 93% | 93% | 94% | 94% |
| | Ellipticity 588 nm | 98% | 98% | 98% | 98% | 97% |
| | Ellipticity 628 nm | 90% | 90% | 90% | 89% | 89% |
| | Ellipticity 751 nm | 72% | 72% | 72% | 72% | 72% |
| 3 m from application termination portion | Angle of absorption axis of elongate polarization film φp (°) | 45.1 | 45.1 | 45.1 | 45.1 | 45.1 |
| | Angle between absorption axis of elongate polarization film and slow axis of film substrate Ψ (°) | 45.4 | 44.8 | 45.3 | 45.4 | 45.3 |
| | Ellipticity 450 nm | 77% | 79% | 78% | 79% | 78% |
| | Ellipticity 550 nm | 91% | 94% | 93% | 94% | 93% |
| | Ellipticity 588 nm | 95% | 97% | 98% | 97% | 98% |
| | Ellipticity 628 nm | 89% | 89% | 90% | 89% | 90% |
| | Ellipticity 751 nm | 72% | 71% | 73% | 71% | 73% |

From the results shown in Table 4, it was confirmed that, in the width direction and in the longitudinal direction of the elongate polarizer plate (3) with 200 m, the absorption axis of the elongate polarization film was at substantially 45° (set value 45°) to the longitudinal direction of the film substrate, and the elongate polarizer plate (3) was produced uniformly. Since highly circular polarized light conversion was performed in a wide range of wavelength, the elongate polarizer plate (3) was found useful for a reflection prevention film such as OLED.

Example 4

Production of Elongate Polarizer Plate (4)

An elongate polarizer plate (4) with 200 m was produced in the same manner as in Example 3, except that the application flow rate of the composition for forming the polarization film was changed to 35.5 ml/minute.

[Evaluation of Elongate Polarizer Plate (4)]

The measurement of the polarization degree/transmittance and the measurement of the haze value were performed similarly in the case of the elongate polarizer plate (1). The results are shown in Table 5. The measurement of the polarization degree/transmittance was performed by incident of polarized light for measurement from the polarization film side of each sample. The thickness was also measured similarly in the case of the elongate polarizer plate (1) to find that the thickness of the photo-orientation film of the elongate polarizer plate (4) was 100 nm and the thickness of the polarization film was 2.5 μm. The ellipticity was measured in the same manner as in Example 3, and the results are shown in Table 6.

TABLE 5

| Elongate polarizer plate (4) | | Polarizer plate | | | | |
|---|---|---|---|---|---|---|
| | | 1 | 2 | 3 | 4 | 5 |
| 3 m from application start portion | Haze value | 0.4% | 0.4% | 0.5% | 0.4% | 0.4% |
| | Py | 98% | 98% | 98% | 98% | 97% |
| | Ty | 41% | 40% | 40% | 40% | 40% |
| | Single body a | 0.2 | 0.2 | 0.1 | 0.1 | 0.2 |
| | Single body b | 1.1 | 1.1 | 1.3 | 1.4 | 1.2 |
| 3 m from application termination portion | Haze value | 0.4% | 0.5% | 0.5% | 0.4% | 0.4% |
| | Py | 97% | 98% | 98% | 97% | 98% |
| | Ty | 40% | 40% | 40% | 40% | 40% |
| | Single body a | 0.1 | 0.1 | 0.1 | 0.1 | 0.1 |
| | Single body b | 1.1 | 1.3 | 1.4 | 1.4 | 1.3 |

TABLE 6

| Elongate polarizer plate (4) | | Polarizer plate | | | | |
|---|---|---|---|---|---|---|
| | | 1 | 2 | 3 | 4 | 5 |
| 3 m from application start portion | Angle of absorption axis of elongate polarization film φp (°) | 45.1 | 45.2 | 45.1 | 45.1 | 45.0 |
| | Angle between absorption axis of elongate polarization film and slow axis of film substrate Ψ (°) | 44.1 | 44.1 | 44.8 | 44.8 | 44.9 |
| | Ellipticity 450 nm | 78% | 79% | 78% | 78% | 78% |

TABLE 6-continued

| Elongate polarizer plate (4) | | Polarizer plate | | | | |
|---|---|---|---|---|---|---|
| | | 1 | 2 | 3 | 4 | 5 |
| | Ellipticity 550 nm | 92% | 93% | 92% | 92% | 93% |
| | Ellipticity 588 nm | 97% | 96% | 99% | 99% | 99% |
| | Ellipticity 628 nm | 90% | 89% | 91% | 91% | 90% |
| | Ellipticity 751 nm | 72% | 72% | 73% | 73% | 72% |
| 3 m from application termination portion | Angle of absorption axis of elongate polarization film φp (°) | 45.1 | 45.1 | 45.2 | 45.0 | 45.1 |
| | Angle between absorption axis of elongate polarization film and slow axis of film substrate Ψ (°) | 44.5 | 44.2 | 44.8 | 45.0 | 44.9 |
| | Ellipticity 450 nm | 79% | 80% | 78% | 79% | 79% |
| | Ellipticity 550 nm | 94% | 94% | 93% | 94% | 94% |
| | Ellipticity 588 nm | 97% | 96% | 98% | 98% | 98% |
| | Ellipticity 628 nm | 89% | 89% | 90% | 90% | 89% |
| | Ellipticity 751 nm | 72% | 71% | 72% | 72% | 72% |

From the results shown in Table 6, it was confirmed that, in the width direction and in the longitudinal direction of the elongate polarizer plate (4) with 200 m, the absorption axis of the elongate polarization film was at substantially 45° (set value 45°) to the longitudinal direction of the film substrate, and the elongate polarizer plate (4) was produced uniformly. Since highly circular polarized light conversion was performed in a wide range of wavelength, the elongate polarizer plate (4) was found useful for a reflection prevention film such as OLED.

INDUSTRIAL APPLICABILITY

The present invention is useful for producing an elongate polarizer plate having the absorption axis in a direction of 45°±15° to the longitudinal direction of the elongate polarizer plate.

What is claimed is:

1. A method for producing an elongate polarizer plate, comprising a step of forming, on an elongate substrate, an elongate polarization film having an absorption axis in a direction of 45°±15° relative to the longitudinal direction of the elongate substrate,
    wherein the elongate polarization film is formed from a second dried layer.

2. The method for producing an elongate polarizer plate according to claim 1, further comprising a step of forming, on the elongate substrate, an elongate orientation film having a direction of an orientation regulating force of 45°±15° relative to the longitudinal direction of the elongate substrate, on the elongate substrate, wherein
    the step of forming the elongate orientation film and the step of forming the elongate polarizer plate are performed in this order.

3. The method for producing an elongate polarizer plate according to claim 2, wherein the elongate orientation film is formed from a first dried layer.

4. The method for producing an elongate polarizer plate according to claim 3, wherein
    the first dried layer is formed by drying a first applied layer formed by continuously applying a composition for forming an orientation film onto the elongate substrate, and
    the elongate orientation film is formed by irradiating the first dried layer with light polarized in a direction of 45°±15° relative to the longitudinal direction of the elongate substrate.

5. The method for producing an elongate polarizer plate according to claim 1, wherein
    the second dried layer is formed by drying a second applied layer formed by continuously applying a composition for forming a polarization film containing a dichromic dye onto an elongate photo-orientation film, and
    the second dried layer is cured to form the elongate polarization film having an absorption axis in a direction of 45°±15° relative to the longitudinal direction of the elongate substrate.

6. The method for producing an elongate polarizer plate according to claim 5, wherein the elongate substrate is an elongate retardation plate having a function of a quarter wave plate.

7. An elongate polarizer plate comprising an elongate substrate and an elongate polarization film, wherein
    the direction of the absorption axis of the elongate polarization film is of 45°±15° relative to the longitudinal direction of the elongate substrate, and wherein
    the elongate polarization film contains a polymer of a polymerizable liquid crystal compound.

8. The elongate polarizer plate according to claim 7, wherein the elongate polarization film has a thickness of 5 μm or less.

9. The elongate polarizer plate according to claim 7, further having an elongate orientation film between the elongate substrate and the elongate polarization film.

10. The elongate polarizer plate according to claim 9, wherein the elongate orientation film is an elongate photo-orientation film.

11. The elongate polarizer plate according to claim 7, wherein the elongate polarization film contains a dichromic dye.

12. The elongate polarizer plate according to claim 7, having a luminous transmittance of 35% or more.

13. A polarizer plate obtained by cutting out the elongate polarizer plate according to claim 7 into a rectangular form with the longer sides thereof forming an angle of 0° or 9° relative to the direction of the elongate substrate.

14. A display device comprising the polarizer plate according to claim 13.

15. A display device with a polarizer plate, the display device being obtained by sticking the elongate polarizer plate according to claim 7 to a display device.

16. An elongate polarizer plate comprising an elongate substrate and an elongate polarization film, wherein
    the direction of the absorption axis of the elongate polarization film is of 45°±15° relative to the longitudinal direction of the elongate substrate, and wherein the elongate polarization film exhibits a Bragg peak in x-ray diffractometry.

17. An elongate polarizer plate comprising an elongate substrate and an elongate polarization film, wherein the direction of the absorption axis of the elongate polarization film is of 45°±15° relative to the longitudinal direction of the elongate substrate, and wherein the elongate substrate is an elongate retardation plate having a function of a quarter wave plate, and the elongate retardation plate has a slow axis in a direction of 0°±15° or 90°±15° relative to a longitudinal direction of the elongate retardation plate.

18. The elongate polarizer plate according to claim 17, wherein the elongate retardation plate has optical characteristics represented by the following formulas (40), (50) and (51):

$$100 < Re(550) < 160 \quad (40)$$

$$Re(450)/Re(550) \leq 1.00 \quad (50)$$

$$1.00 \leq Re(650)/Re(550) \quad (51)$$

wherein Re(450), Re(550), and Re(650) represent retardations to light with wavelengths of 450 nm, 550 nm, and 650 nm, respectively.

19. The elongate polarizer plate according to claim 17, wherein the elongate polarizer plate has an ellipticity for the entire range visible light of 50% or more and an ellipticity to light with a wavelength of 550 nm of 70% or more.

20. An elongate polarizer plate comprising an elongate substrate and an elongate polarization film, wherein the direction of the absorption axis of the elongate polarization film is of 45°±15 relative to the longitudinal direction of the elongate substrate, and wherein the elongate polarizer plate has a luminous degree of polarization of 80% or more.

\* \* \* \* \*